(12) United States Patent
Kamada et al.

(10) Patent No.: US 6,466,694 B2
(45) Date of Patent: Oct. 15, 2002

(54) DOCUMENT IMAGE PROCESSING DEVICE AND METHOD THEREOF

(75) Inventors: Hiroshi Kamada; Katsuhito Fujimoto; Koji Kurokawa, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,712

(22) Filed: Apr. 16, 1998

(65) Prior Publication Data

US 2001/0014176 A1 Aug. 16, 2001

(30) Foreign Application Priority Data

Nov. 18, 1997 (JP) ................................. 9-316849

(51) Int. Cl.⁷ .......................... G06K 9/00; G06K 9/03; G09G 5/00; H04N 9/74; G06F 17/30
(52) U.S. Cl. ..................... 382/181; 382/173; 382/177; 382/178; 382/187; 382/189; 382/190; 382/203; 382/284; 382/309; 345/629; 348/584; 707/6; 707/530
(58) Field of Search ................ 382/177, 181, 382/309, 310, 311, 189, 190, 203, 229, 187, 115, 173, 178, 185, 186, 188, 209, 231, 282, 284; 345/629; 348/584; 707/6, 500, 530, 533

(56) References Cited

U.S. PATENT DOCUMENTS

| | | | | |
|---|---|---|---|---|
| 5,113,492 A | * | 5/1992 | Ariki et al. | 707/520 |
| 5,231,579 A | * | 7/1993 | Tsuchiya et al. | 707/508 |
| 5,257,328 A | * | 10/1993 | Shimizu | 382/311 |
| 5,271,067 A | * | 12/1993 | Abe et al. | 382/311 |
| 5,394,484 A | * | 2/1995 | Casey et al. | 382/159 |
| 5,455,875 A | * | 10/1995 | Chevion et al. | 382/311 |
| 5,509,092 A | * | 4/1996 | Hirayama et al. | 382/301 |
| 5,717,794 A | * | 2/1998 | Koga et al. | 382/309 |
| 5,841,901 A | * | 11/1998 | Arai et al. | 382/309 |
| 5,889,897 A | * | 3/1999 | Medina | 382/311 |
| 5,917,942 A | * | 6/1999 | Ehsani et al. | 382/311 |
| 5,933,531 A | * | 8/1999 | Lorie | 382/311 |
| 6,043,823 A | * | 3/2000 | Kodaira et al. | 345/619 |

* cited by examiner

Primary Examiner—Leo Boudreau
Assistant Examiner—Daniel G. Mariam
(74) Attorney, Agent, or Firm—Staas & Halsey LLP

(57) ABSTRACT

A processing device performs region identification of an input image, and then performs an intra-region recognition process. The type code of each region and the individual code of a recognition result are then displayed, so that a user can modify both of the results of the region identification and the recognition process at one time. Furthermore, the processing device displays an original image close to the recognition result. If no correct answer exists among recognition candidates, code is added to the original image, and the original image with the code added is handled as a recognition result.

30 Claims, 39 Drawing Sheets

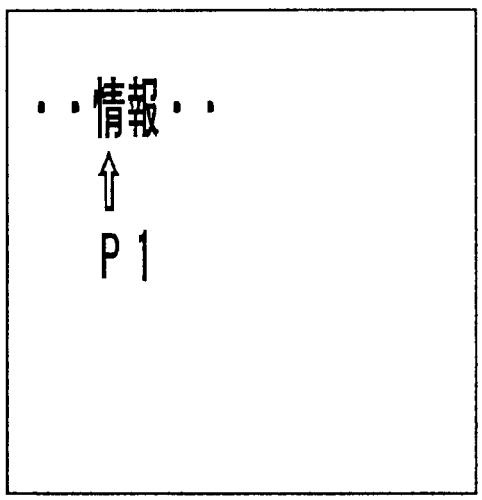
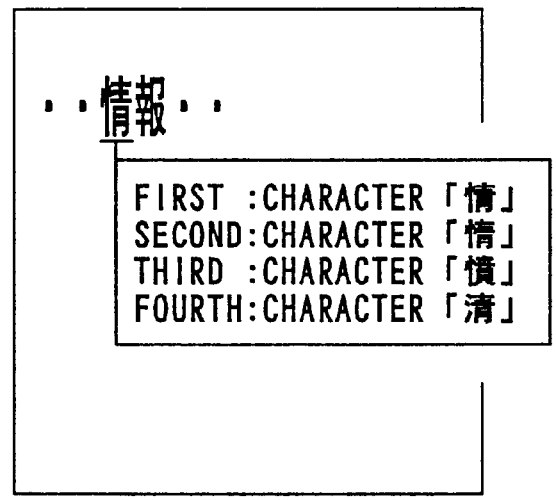
FIG. 1B
PRIOR ART

| REGION TYPE CODE | INDIVIDUAL CODE |
|---|---|
| TEXT | NONE |
| TABLE | NONE |
| GRAPHIC | NONE |
| FRAME | NONE |
| CHARACTER | CHARACTER CODE (EX.: あ、い、う、・・・)(9) |

F I G. 4

| UPPER HIERARCHICAL LEVEL | LOWER HIERARCHICAL LEVEL |
|---|---|
| TEXT | CHARACTER |
| TABLE | RULED LINE, CHARACTER |

F I G. 7

| REGION TYPE | INDIVIDUAL CODE |
| --- | --- |
| FIRST ; CHARACTER | FIRST ;「あ」 |
| SECOND; TABLE | SECOND;「い」 |
| THIRD ; GRAPHIC | THIRD ;「う」 |
| FOURTH; FRAME | FOURTH;「え」 |

FIG. 9

```
FIRST    ; CHARACTER 「あ」
SECOND   ; CHARACTER 「い」
THIRD    ; CHARACTER 「う」
FOURTH   ; CHARACTER 「え」
FIFTH    ; TABLE
SIXTH    ; GRAPHIC
SEVENTH  ; FRAME
```

FIG. 10

```
FIRST    ; TABLE
SECOND   ; GRAPHIC
THIRD    ; FRAME
FOURTH   ; CHARACTER 「あ」
FIFTH    ; CHARACTER 「い」
SIXTH    ; CHARACTER 「う」
SEVENTH  ; CHARACTER 「え」
```

FIG. 11

```
FIRST   ; TABLE
SECOND  ; GRAPHIC
THIRD   ; FRAME
FOURTH  ; CHARACTER
```

FIG. 12

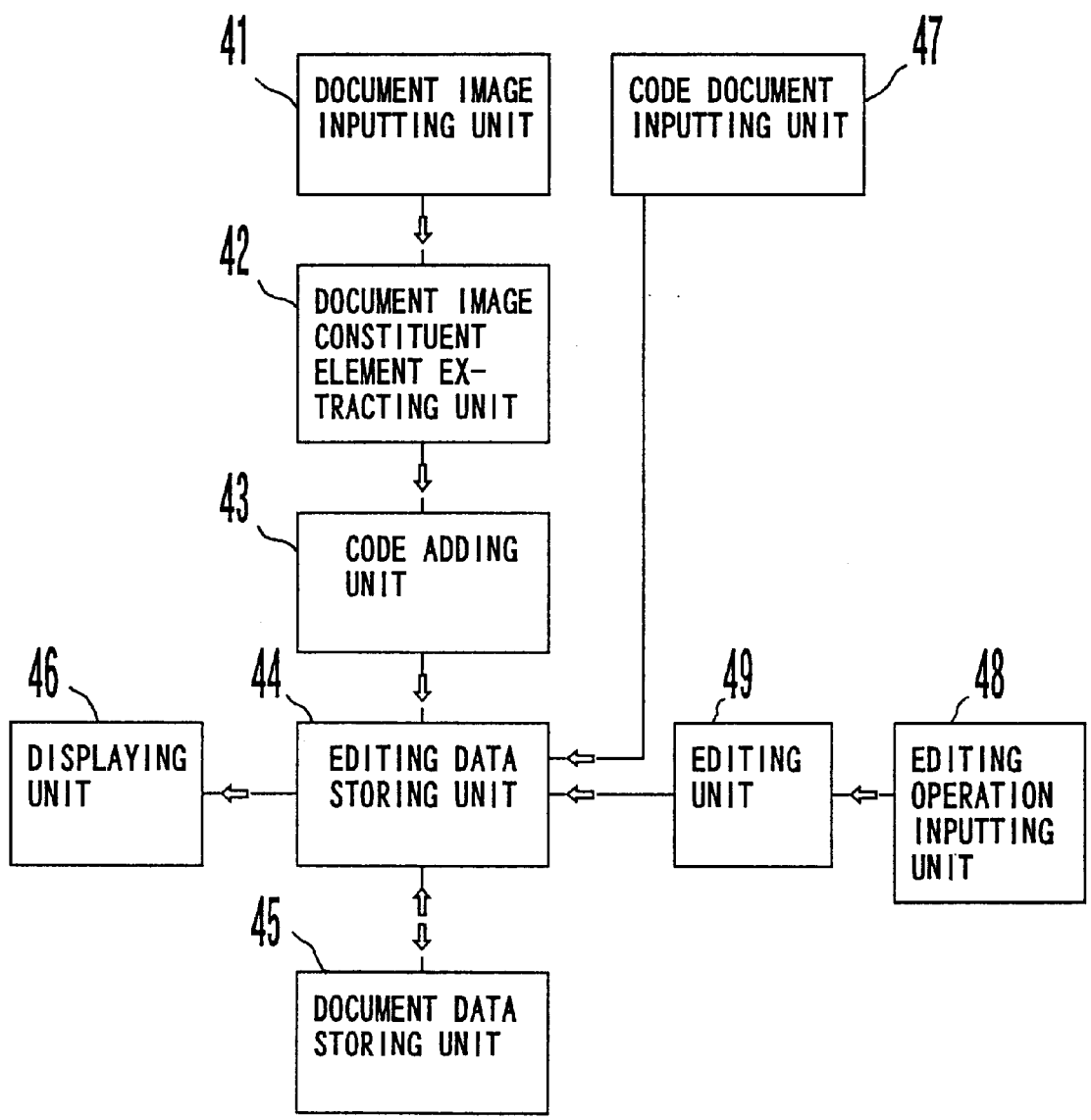
F I G. 1 5

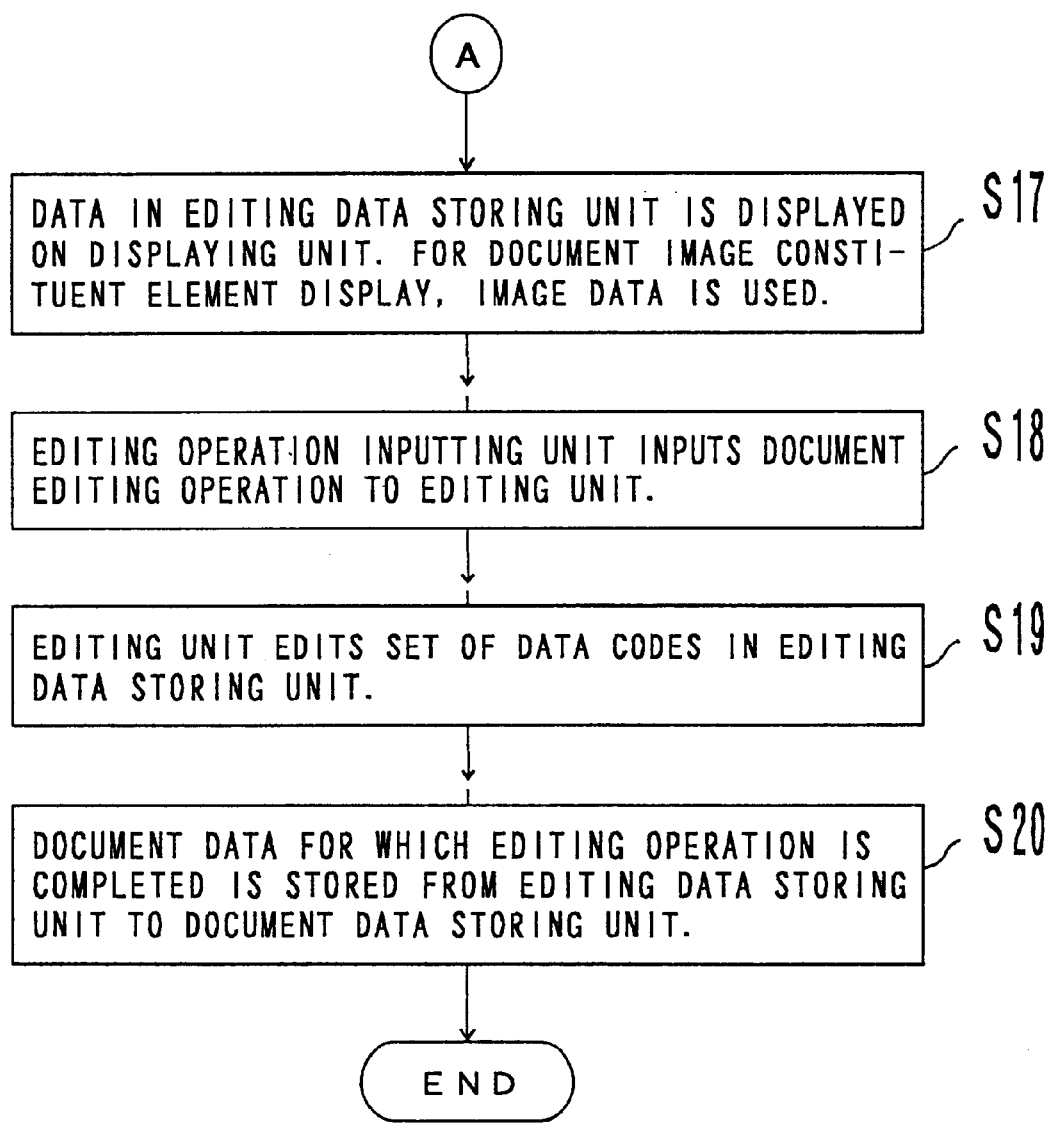
F I G. 1 7

| PATTERN | CODE |
|---|---|
| DOCUMENT IMAGE CONSTITUENT ELEMENT | NEW CODE |
| EXISTING CHARACTER PATTERN | EXISTING CODE |

RECOGNITION RESULT

・・惰報・・

FIRST ;CHARACTER 「惰」 65
SECOND;CHARACTER 「情」 60
THIRD ;CHARACTER 「愭」 55
FOURTH;CHARACTER 「清」 50
FIFTH ;CHARACTER 「憶」 45

FIG. 34

RECOGNITION RESULT

・・情報・・

FIRST ;CHARACTER 「情」 70
SECOND;CHARACTER 「惰」 65
THIRD ;CHARACTER 「憤」 55
FOURTH;CHARACTER 「清」 50
FIFTH ;CHARACTER 「憶」 45

F I G. 3 5

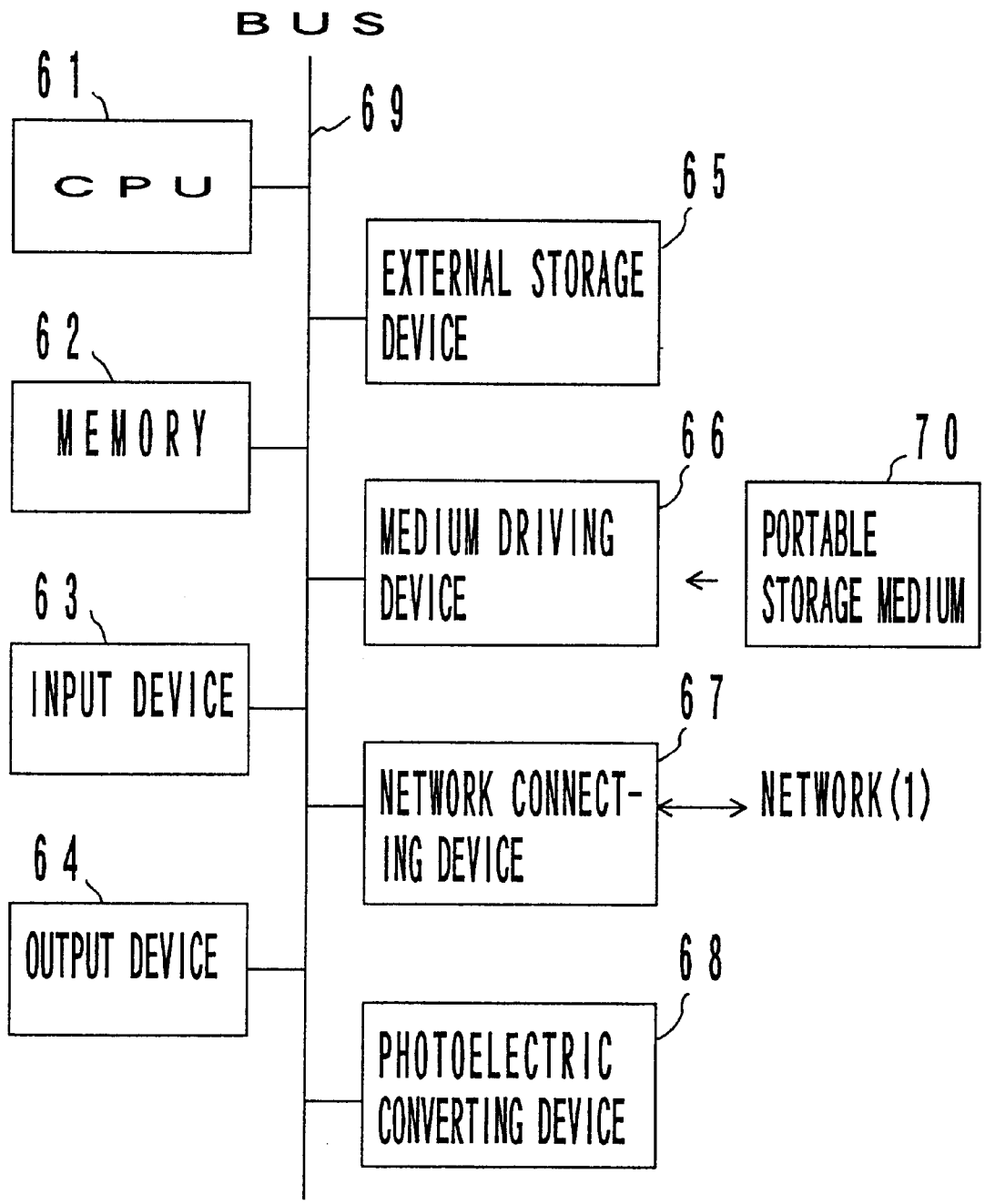
F I G. 3 6

DOCUMENT IMAGE PROCESSING DEVICE AND METHOD THEREOF

BACKGROUND OF THE INVENTION

1. Field of the Invention

The present invention relates to a document image processing device for determining an image of a document image constituent element such as a text, a table, a graphic, a frame, etc. by using a document image as an input, and performing a coding process by recognizing the document image constituent element.

2. Description of the Related Art

With the increasing popularity of personal computers and with the improvement of networking of communications in recent years, a large number of electronic documents have been distributed. However, a principal medium of information distribution is still a paper document, and there are a lot of existing paper documents. Therefore, the demand of a document image recognizing/editing device for converting a paper document into an electronic document and editing a conversion result is on the rise.

The document image recognizing/editing device is a device for determining an image of a document image constituent element such as a character, a table, a graphic, a frame, etc. by using a document image as an input, and performing a coding process by recognizing the document image constituent element. With the coding process, a character image is converted into a character code.

However, since a correct answer ratio does not become 100 percent with the recognition process performed by the document image processing device, how to handle a recognition result which is not correct is a problem. Especially, the scheme for efficiently performing a modification process is required.

FIG. 1A is a block diagram showing the configuration of a conventional document image recognizing/editing device. A document image inputting unit 1 inputs a document image to be processed. A region identifying unit 2 identifies an individual region in an image, and stores the result in a region identification result storing unit 3. A displaying unit 8-displays the region identification result on a screen, and a user modifies the result depending on need. At this time, a first modifying unit 6 modifies the data in the region identification result storing unit 3. Next, an individual region recognizing unit 4 recognizes a character in an individual region, and stores the recognition result in a recognition result storing unit 5. Then, the displaying unit 8 displays the recognition result on a screen, and the user modifies the result depending on need. At this time, a second modifying unit 7 modifies the data stored in the recognition result storing unit 5.

With such a document image recognizing/editing device, the handling and modification operations of the recognition result whose correct answer ratio does not become 100 percent are processed as follows.

(1) After the attribute such as a text, a table, a graphic, a frame, etc. of a document image constituent element in an individual region is modified if necessary and determined as a region identification process performed by the region identifying unit 2, the individual region recognizing unit 4 recognizes an individual document image constituent element according to its attribute. If the region is a text region, an individual character image is determined and character recognition is performed. If the region is a table region, a ruled line is extracted; a character region of each cell is determined, and character recognition is performed. The recognition result is modified depending on need.

(2) The result of the character recognition process includes a string of candidate character codes listed in a probable order as shown in FIG. 1B. A first candidate character code is an initial value of a recognition result. The second modifying unit 7 displays a second and subsequent candidate character codes, one of which a user can select. When the character recognition result is modified, a corresponding character image is displayed in the original position P1 in the input image.

However, the conventional document image recognizing/editing device has the problem that a considerable workload is required for modifying a recognition result as stated below.

(1) A conventional document image process includes two stages such as region identification and intraregion recognition, each of which includes a modification process performed by a user. That is, the user must perform the modification process twice, which leads to troublesome operation of the operations. Additionally, even if there is no identification error at the stage of the region identification, the presence/absence of an identification error must be verified. If this verification is omitted, the portion where an identification error occurs cannot be modified after the intra-region recognition. To obtain a correct process result in this case, the process must be again performed from the beginning, and the identification error must be modified at the stage of the region identification.

(2) The information included in a recognition result display of a document image constituent element is only code information as shown in FIG. 1B. Therefore, to verify whether or not a character recognition result is correct, the position P1 of the corresponding document image constituent element in the input image is enclosed by a frame and displayed if a target character is instructed in the recognition result display. However, an amount of a move of a user viewpoint is large when a comparison and verification between the code information of a recognition result display and a character image of an input image are made. Accordingly, the verification process will impose a load on a user.

Furthermore, a correct character does not exist among candidate characters at the time of modification and selection of a candidate character code. In this case, the correct character code must be input from scratch, so that the input operation becomes a burden of the user.

SUMMARY OF THE INVENTION

An object of the present invention is to provide a document image processing device for reducing a user load and implementing efficient operations when a process result is verified and modified by a document image recognizing/editing device, and a method thereof.

The document image processing device according to the present invention comprises an identifying unit, a recognizing unit, an outputting unit, a modifying unit, an extracting unit, a code adding unit, and an editing unit. This device performs a recognition process of an input image.

In a first aspect of the present invention, the identifying unit, the recognizing unit, the outputting unit, and the modifying unit operate as follows.

The identifying unit identifies a pattern region of an input image, and determines the type of the pattern region. The recognizing unit performs a recognition process of a pattern included in the pattern region. The outputting unit outputs the type information indicating the type of the pattern region and the individual information indicating the pattern as recognition result candidates of an image constituent element structuring the input image. The modifying unit modifies the recognition result candidates.

With such a document image processing device, the region identification and the intra-region recognition of a document image are simultaneously performed, and the results can be simultaneously modified. Therefore, the conventional modification operations performed at two stages are no longer needed, thereby reducing a user load on the modification operations.

In a second aspect of the present invention, the outputting unit, the extracting unit, the code adding unit, and the editing unit operate as follows.

The extracting unit extracts an image constituent element structuring an input image from the input image. The code adding unit adds new code information to the image constituent element. The outputting unit outputs the document information where the image data corresponding to the image constituent element and a character pattern corresponding to existing code information are mixed. The editing unit edits the document information by using the new code information and the existing code information.

With such a document image processing device, also an original image can be displayed close to a candidate of a character recognition result by using code information added to an image constituent element, thereby reducing the amount of a viewpoint move for making a comparison and verification between the recognition result and the input image.

In a third aspect of the present invention, the recognizing unit, the outputting unit, and the extracting unit operate as follows.

The extracting unit extracts an image constituent element structuring an input image from the input image. The recognizing unit performs a recognition process of the image constituent element. The outputting unit separates the image data corresponding to the image constituent element from the input image, and outputs the separated data together with one or more candidates of the recognition result of the image constituent element.

With such a document image processing device, the image of an image constituent element extracted from an input image can be displayed close to its recognition result candidates, thereby reducing the amount of a viewpoint move for making a comparison and verification between a recognition result and the input image. Furthermore, if no correct answer exists among the recognition result candidates, the original image can be selected and modified, which eliminates the need for re-inputting a character code for modification.

BRIEF DESCRIPTION OF THE DRAWINGS

FIG. 1B is a schematic diagram showing a conventional recognition result display;

FIG. 4 shows type codes and individual codes;

FIG. 7 shows hierarchy of document image constituent elements;

FIG. 9 shows a first display of a recognition result;

FIG. 10 shows a second display of the recognition result;

FIG. 11 shows a third display of the recognition result;

FIG. 12 shows a fourth display of the recognition result;

FIG. 15 is a block diagram showing the second configuration of the document image processing device;

FIG. 17 is a flowchart showing the second document image process (No.2);

FIG. 18 shows editing data;

FIG. 19 shows a code document;

FIG. 20 shows a document image;

FIG. 21 shows extracted document image constituent elements;

FIG. 22 shows a first display of an editing result;

FIG. 23 shows a second display of the editing result;

FIG. 24 shows a third display of the editing result;

FIG. 25 shows a first reduction display;

FIG. 26 shows a second reduction display;

FIG. 34 shows a seventh display of the recognition result;

FIG. 35 shows an eighth display of the recognition result;

FIG. 36 is a block diagram showing the configuration of an information processing device.

DESCRIPTION OF THE PREFERRED EMBODIMENTS

Figure 1A:
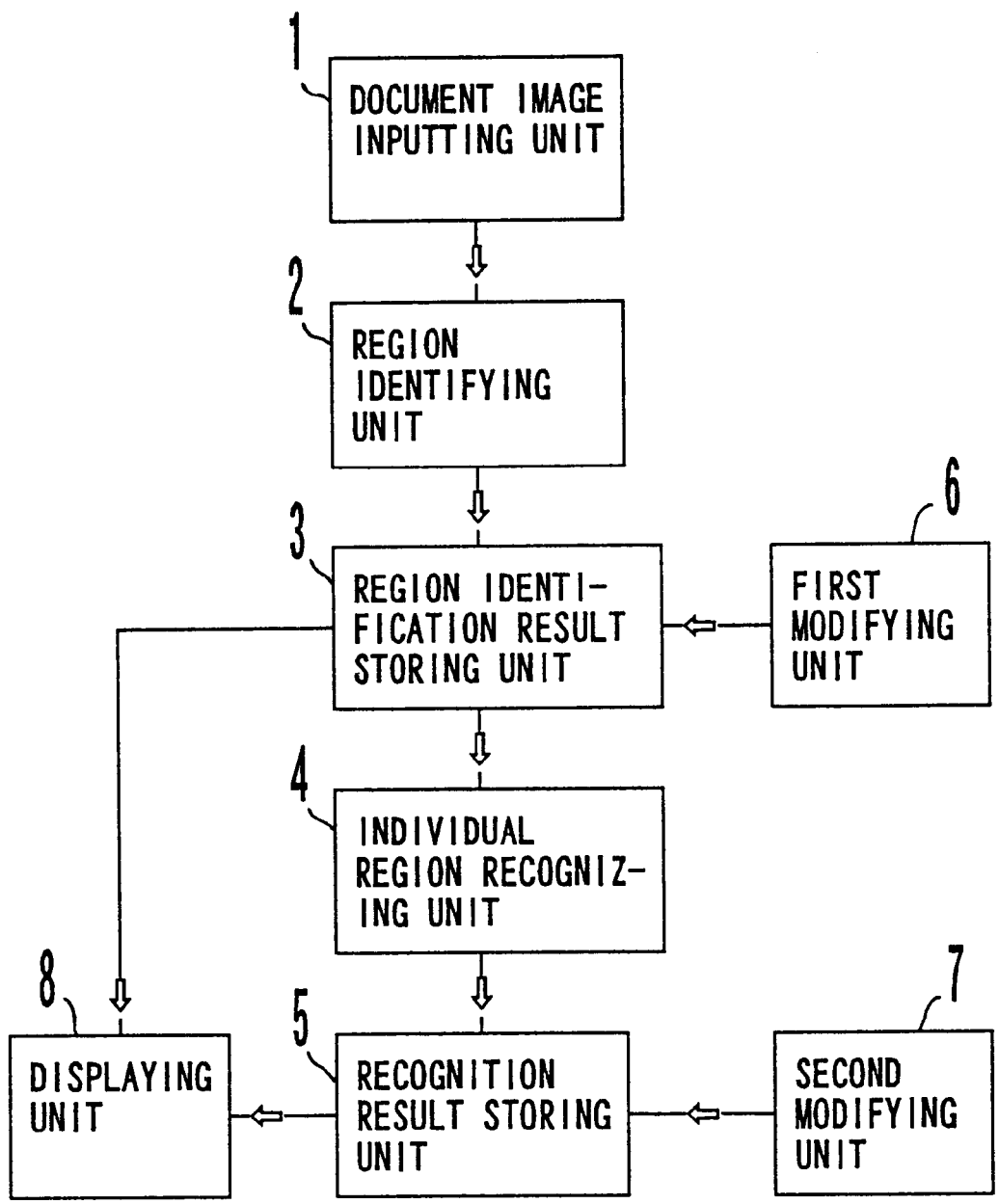
FIG. 1A is a block diagram showing the configuration of a conventional document image recognizing/editing device.

Provided below is the explanation about the details of preferred embodiments according to the present invention, by referring to the drawings.

Figure 2:
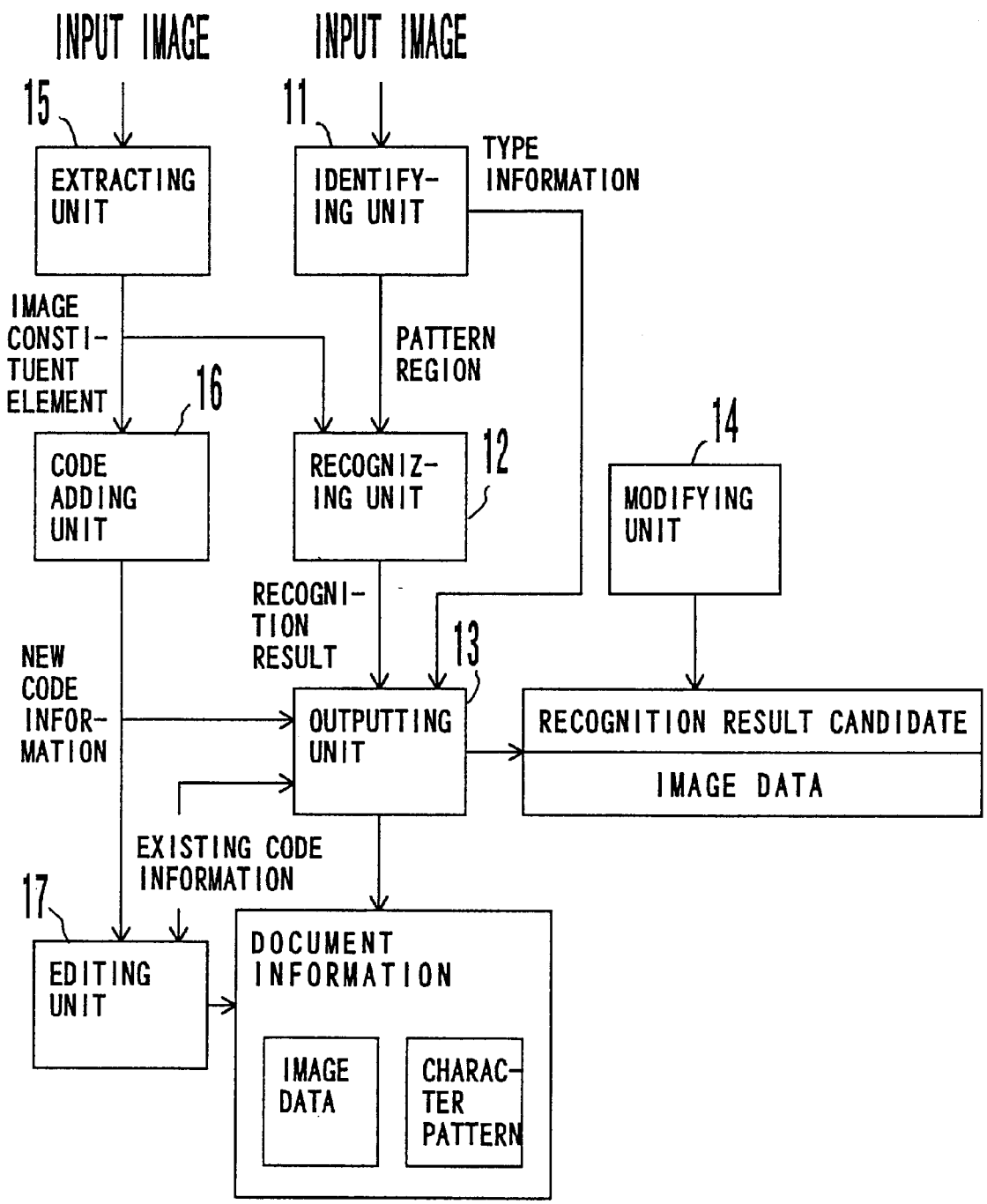
FIG. 2 is a block diagram showing the principle of a document image processing device according to the present invention.

FIG. 2 is a block diagram showing the configuration of a document image processing device according to the present invention. The document image processing device shown in this figure comprises an identifying unit 11, a recognizing unit 12, an outputting unit 13, a modifying unit 14, an extracting unit 15, a code adding unit 16, and an editing unit 17. This device performs a recognition process of an input image.

According to the first principle of the present invention, the identifying unit 11, the recognizing unit 12, the outputting unit 13, and the modifying unit 14 operate as follows.

The identifying unit 11 identifies a pattern region of an input image, and determines the type of the pattern region.

The recognizing unit 12 performs a recognition process of the pattern included in the pattern region.

The outputting unit 13 outputs the type information indicating the type of the pattern region and the individual information indicating the pattern as recognition result candidates of an image constituent element structuring the input image.

The modifying unit 14 modifies the recognition result candidates.

The pattern region indicates an image region such as a text, a table, a graphic, a frame, a character, etc., which are included in the input image. One pattern region may sometimes include another pattern region. For example, a text pattern region is normally composed of a plurality of character pattern regions. The image constituent element indicates a partial image of an input image, and corresponds to a pattern region or a pattern in a pattern region.

The identifying unit 11 determines which of the text, table, graphic, frame, character, etc. the type of the pattern region to be recognized corresponds to. The recognizing unit 12 performs a recognition process such as character recognition, ruled line recognition, etc. for the pattern region having an internal structure such as a text, a table, a frame, etc.

The outputting unit 13 outputs the type information of the pattern region and the individual information such as a character font representing the recognized pattern in a lump as a recognition result candidate. A user can modify the type information and the individual information in a lump by using the modifying unit 14 while viewing the output result.

As described above, according to the first principle, the region identification and the intraregion recognition of a document image can be simultaneously performed, and the results can be simultaneously modified. Therefore, a user no longer need to perform the conventional modification operations at two stages, thereby reducing the user load on the modification operations.

According to the second principle of the present invention, the outputting unit 13, the extracting unit 15, the code adding unit 16, and the editing unit 17 operate as follows.

The extracting unit 15 extracts an image constituent element structuring an input image from the image.

The code adding unit 16 adds new code information to the image constituent element.

The outputting unit 13 outputs the document information where the image data corresponding to the image constituent element and the character pattern corresponding to existing code information are mixed.

The editing unit 17 edits the document information by using the new code information and the existing code information.

Addition of code information to an image constituent element extracted from an input image allows the image constituent element to be handled similar to the character pattern corresponding to existing code information. Accordingly, the document where a partial image of an input image and a character pattern provided as code information are mixed can be displayed and edited.

According to the second principle, an original image may be displayed close to a recognition result candidate by using the code information added to an image constituent element, thereby reducing the amount of a viewpoint move for making a comparison and verification between the recognition result and the input image.

According to the third principle of the present invention, the recognizing unit 12, the outputting unit 13, and the extracting unit 15 operate as follows.

The extracting unit 15 extracts an image constituent element structuring an input image from the image.

The recognizing unit 12 performs a recognition process of the image constituent element.

The outputting unit 13 separates the image data corresponding to the image constituent element from the input image, and outputs the image data together with one or more candidates of the recognition result of the image constituent element.

According to the third principle, the image of an image constituent element extracted from an input image can be displayed near to its recognition result candidate on a screen, thereby reducing the amount of a viewpoint move for making a comparison and verification between the recognition result and the input image. Additionally, if no correct answer is included in recognition result candidates, the original image can be selected and modified. It eliminates the need for re-inputting the character code for modification.

Figure 3A:
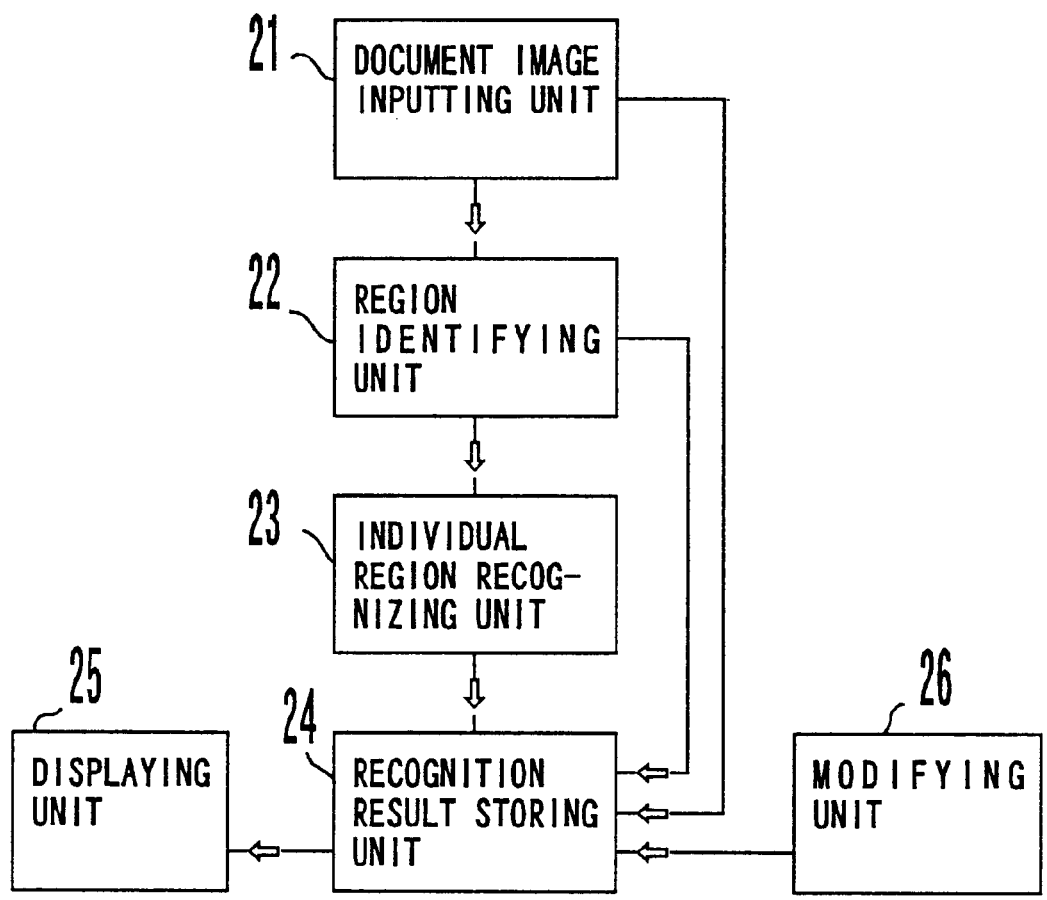
FIG. 3A is a block diagram showing the first configuration of the document image processing device.

For example, the identifying unit 11, the recognizing unit 12, and the modifying unit 14, which are shown in FIG. 2, respectively correspond to a region identifying unit 22, an individual region recognizing unit 23, and a modifying unit 26, which are shown in FIG. 3A and will be described later. The extracting unit 15, the code adding unit 16, and the editing unit 17 respectively correspond to a document image constituent element extracting unit 42, a code adding unit 43, and an editing unit 49, which are shown in FIG. 15 and will be described later. Additionally, for example, the outputting unit 13 shown in FIG. 2 corresponds to a displaying unit 25 shown in FIG. 3A and a displaying unit 46 shown in FIG. 15.

According to the present invention, the following solutions are applied to the above described conventional problems (1) and (2).

(1) An identification result candidate of region identification is stored also at an intra-region recognition stage so that the identification result candidate and an intra-region recognition result candidate can be simultaneously modified and selected. In this way, the region identification and the intra-region recognition can be performed at the same time, thereby simultaneously modifying the process results.

The document image processing device uses a document image as an input, identifies a region such as a text, a table, a graphic, a frame, etc., and performs an intra-region recognition process such as character recognition, ruled line recognition, etc. At this time, the type code of the region such as a text, a table, a graphic, a frame, etc. and the individual code such as a character code are included as the recognition result candidate codes of the document image constituent element, which is composed of a region and regions inside the region. In consequence, the document image processing device allows the results of the region identification and the intra-region recognition to be simultaneously modified.

To modify a recognition code, the means for instructing a document image constituent element is required. The document image constituent element is a partial image of a document image, and means an element structuring the document image such as a character, etc. Normally, the document image constituent element is instructed using the coordinate position of a document image region. Therefore, the region of the document image constituent element is defined with either of the following methods (a) and (b).

(a) The region of the document image constituent element is defined as a pixel region corresponding to a character/graphic of the document image constituent element.

(b) The region of the document image constituent element is defined as an inside of a circumscribed rectangle of a character/graphic of the document image constituent element.

With the above defined region of the document image constituent element and the instruction coordinate position of the document image region, the following means (a), (b), and (c) are considered as the methods for initially instructing the document image constituent element.

(a) The innermost document image constituent element including the instruction coordinate of a document image is defined as an instruction target.

(b) The largest document constituent element including the instruction coordinate of a document image is defined as an instruction target.

(c) The document image constituent element whose circumscribed frame is closest to the instruction coordinate of a document image is defined as an instruction target.

Although a document image constituent element that cannot be instructed may sometimes arise with the above described methods (a) and (b), such a document image constituent element can be instructed based on the relationship with a previously instructed document image constituent element with the following methods (a) and (b) in addition to the above described method (c).

(a) The innermost document image constituent element including a previously instructed document image constituent element is defined as an instruction target.

(b) The largest document image constituent element including the instruction coordinate of a document image in a previously instructed document image constituent element is defined as an instruction target.

The method for presenting the recognition result candidate code of a document image constituent element to a user is, for example, like the following methods (a) and (b).

(a) If the first recognition result candidate is a "character", character recognition is performed and the candidate character codes of the character recognition result are defined as upper recognition result candidate codes. The type codes of document constituent elements such as a "table", a "graphic", a"frame", etc. other than the "character" are defined as lower recognition result candidate codes.

(b) If the first recognition result candidate is any of the types of the document image constituent element such as the "text", "table", "graphic", "frame", etc. other than the "character", the type code of the document image constituent element is defined as the first recognition result candidate code, and the type codes of the document image constituent element other than the first recognition result candidate are defined as lower recognition result candidate codes.

The operations performed at the time of a modification-instruction are like the following (a) and (b).

(a) If the type code of the "character" is modification-instructed as a recognition result candidate code, the character recognition of the corresponding input character image is performed and the "character" of the recognition result candidate code is replaced with a single or a plurality of character recognition result candidate character codes.

(b) If the type code of the document image constituent element such as the "table", "graphic", "frame", etc. other than the "character" is modification-instructed as a recognition result candidate code, the recognition as the document image constituent element of the instructed type is performed for the corresponding input character image.

(2) The character image is displayed within the candidate character display region of the character recognition result, so that the amount of a viewpoint move for making a comparison and verification between the recognition result and the input image is reduced.

The document image processing device uses a document image as an input, determines the image of a document image constituent element such as a character, a table, a graphic, a frame, etc., and performs a coding process by recognizing the document image constituent element. At this time, the image of the document image constituent element is displayed together with a recognition result candidate code as a recognition result candidate display. Consequently, the amount of a viewpoint move for making a comparison and verification between the recognition result and the input image is reduced.

Additionally, the document image constituent element image in the recognition result candidate display of the document image constituent element can be modification-instructed. If the document image constituent element is modification-instructed, it can be edited by corresponding a new code to the document image constituent element. As a result, even if no correct character exists among recognition result candidate characters, a character image is selected so that the recognition result can be correctly modified without fail and can be edited.

To modification-instruct the document image constituent element image and edit it by corresponding a new code thereto, display information of the new code is displayed on a displaying unit, so that the document where the existing code and the new code are mixed can be edited. More typically, the document where existing code and a new code are mixed can be edited by using a document image as an input, and displaying the display information of a new code on a displaying unit by corresponding the new code to a document image constituent element image when the image of the document image constituent element is determined.

As the display information of a new code corresponding to a document image constituent element image, the following information (a) and (b) are available.

(a) A reduced or enlarged image including an equimultiple image of the document image constituent element image.

(b) data obtained by vectorizing the outline of the document image constituent element image.

If a modification-instructed document image constituent element image can be edited by corresponding a new code to the image, to which the type attribute such as a "character", a "table", a "graphic", a "frame", etc. is additionally given, a value can be added to the editing process at a later stage. The method for automatically giving the attribute of the first recognition candidate code as the type attribute is considered. If an interface unit for modification-instructing the type attribute of the document image constituent element image is arranged, more flexible modification can be made.

When a document where an existing code and a new code are mixed is edited, the degree of certainty (reliability) may be given to a recognition result candidate code. A predetermined degree of certainty is given also to the document image constituent element image so as to handle the document image constituent element image as a recognition result candidate, and recognition result candidate codes and the document image constituent element image are sequentially ranked in descending order of the degree of certainty. If a document image constituent element image is handled as a recognition result candidate, there is the effect that the modification operations become much more smooth.

If an interface unit by which the value of the degree of certainty to be given to the document image constituent element image can be externally input is arranged, there is the effect that a recognition result can be adapted for a use purpose of a user. That is, if the degree of certainty to be given to the document image constituent element image is higher, the probability that the document image constituent element image ranks first among recognition results becomes higher. At this time, the probability that the result is put into an existing code becomes lower and also the error recognition ratio becomes lower. If the degree of certainty to be given to the document image constituent element image is lower, the probability that the document image constituent element image ranks first among recognition results becomes lower. At this time, not only the probability that the result is put into an existing code, but also the error recognition ratio become higher.

Additionally, if the means, which comprises the window for interactively inputting the degree of certainty of the document image constituent element image and displaying only the first recognition result candidate, for changing the displayed first recognition result candidate depending on need is arranged, the interactive adjustment for each document to be recognized becomes possible.

Provided next are the explanations about the configuration of the document image processing device and the specific examples of the above described processes.

Figure 3B:
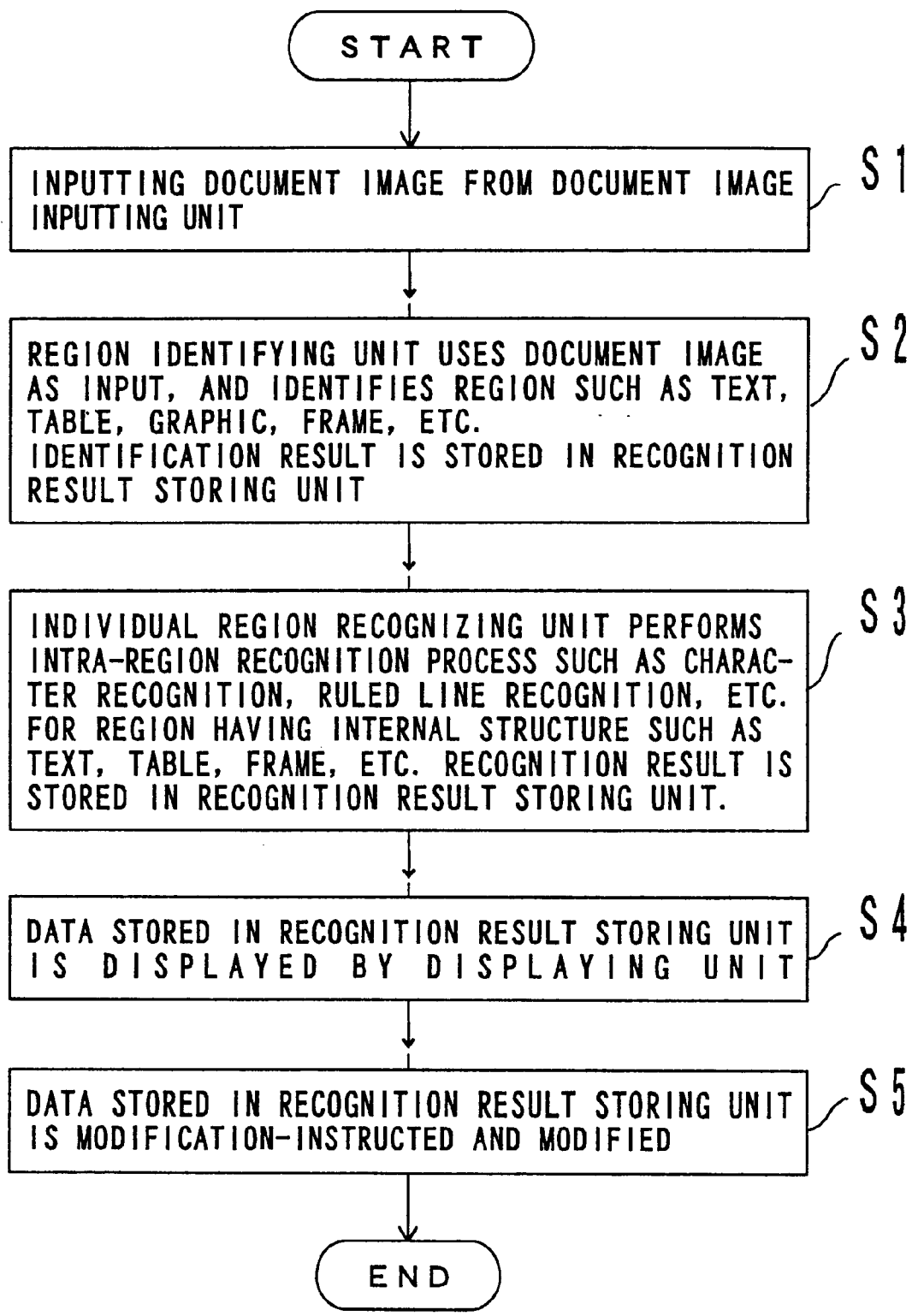
FIG. 3B is a flowchart showing a first document image process.

FIG. 3A is a block diagram showing the first configuration of the document image processing device according to the present invention. The document image processing device shown in FIG. 3A comprises a document image inputting unit 21, a region identifying unit 22, an individual region recognizing unit 23, a recognition result storing unit 24, a displaying unit 25, and a modifying unit 26. This device performs the process shown in FIG. 3B.

First, the document image inputting unit 21 inputs a digital image obtained by putting a document into an electronic form (step S1). As the document image inputting unit 21, for example, a scanner which digitizes a paper document is used. The region identifying unit 22 identifies an individual region such as a text, a table, a graphic, a frame, etc. by using a document image as an input (step S2). The individual region recognizing unit 23 performs an intra-region recognition process such as character recognition, ruled line recognition, etc. for a region having the internal structure such as the text, table, frame, etc. (step S3).

The process results obtained by the region identifying unit 22 and the individual region recognizing unit 23 are stored in the recognition result storing unit 24. That is, the region type code such as the text, table, graphic, frame, etc. and the individual code such as a character code, etc. are stored together as recognition result candidate codes of the document image constituent element consisting of a region and a region inside the region.

FIG. 4 exemplifies the type codes of a region and the individual code. In this figure, a "text", a "table", a "graphic", a "frame", and a "character" indicate the type codes, while a "character code" indicates the individual code corresponding to the "character". Here, the individual codes corresponding to the "text", the "table", the "graphic", and the "frame" are not defined.

The data stored in the recognition result storing unit 24 is displayed on the screen of the displaying unit 25 (step S4), and at the same time, it is modified according to a user modification instruction input from the modifying unit 26 (step S5). Specifically, the data of a recognition result candidate code of a document image constituent element is modified.

For the modification operation of the data of the recognition result candidate code, which is performed by the modifying unit 26, the document image constituent element to be modified must be selected. The document image constituent element is normally selected according to a coordinate instruction using a pointing device, etc. on a display screen. Accordingly, the image range (region) of the document image constituent element must be predetermined.

Figure 5:
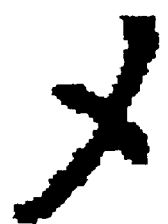
FIG. 5 shows a first image range.

As the image range of the document image constituent element, a black pixel concatenation region of the document image constituent element can be used. By way of example, for the document image constituent element shown in FIG. 5, the black pixel portion forming the image "メ" is regarded as the image range.

Figure 6:
FIG. 6 shows a second image range.

Additionally, a circumscribed rectangle of a document image constituent element may be used as the image range of the document image constituent element. By way of example, for the document image constituent element shown in FIG. 5, the circumscribed rectangle of the black pixel concatenation region of the image "メ" will become the image range as shown in FIG. 6. Use of such an image range allows a corresponding document image constituent element to be instructed even if a white pixel portion surrounding a black pixel portion is designated. That is, there is the advantage that it is easier to instruct the corresponding document image constituent element with the white pixel portion rather than with the black pixel portion.

Since a document image constituent element may sometimes include the elements which are conceptually hierarchical such as a text region and a character region included in the text region, the corresponding document image constituent element may not be uniquely determined with one instruction coordinate of an image. Normally, if two document image constituent elements are conceptually hierarchical, they have an inclusive relationship. By way of example, for the document image constituent elements shown in FIG. 7, the text region includes the character region, while the table region includes the ruled line region and the character region.

To uniquely determine the document image constituent element with one instruction coordinate in such a case, the innermost document image constituent element among a plurality of document image constituent elements including the instruction coordinate is regarded as having been instructed.

Figure 8:
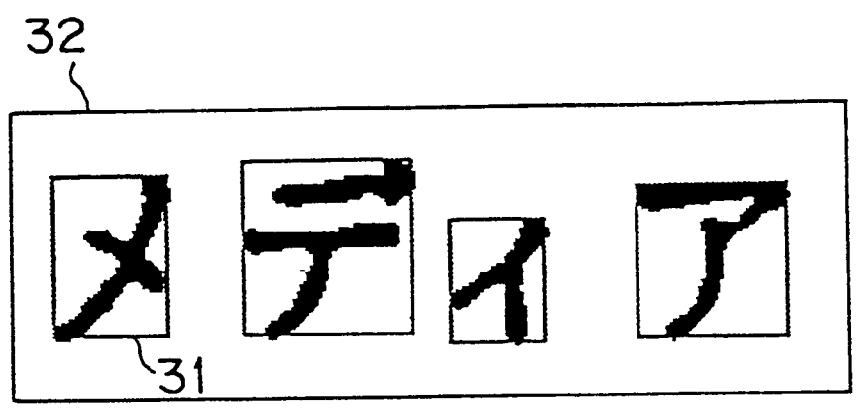
FIG. 8 shows document image constituent elements having an inclusive relationship.

For example, in the image shown in FIG. 8, the text "メデイア", which is the document image constituent element, includes four document image constituent elements "メ", "デ", "ィ", and "ア". Here, assume that the image range of each of the document image constituent elements is defined with its circumscribed rectangle. If a user instructs a coordinate point in the circumscribed rectangle 31 of the document image constituent element "メ" in this example, the document image constituent element "メ" is detected as an instruction target.

Or, the outermost document image constituent element including the instruction coordinate may be regarded as having been instructed. In the example shown in FIG. 8, whichever point in the circumscribed rectangle 32 of the text "メディア" the user instructs, "メディア" is detected as the instruction target. Accordingly, even if a point in the circumscribed rectangle 31 of "メ" is instructed, "メディア" is regarded as the instruction target.

Additionally, the document image constituent element whose circumscribed frame is closest to the instruction coordinate may be regarded as having been instructed. In the example shown in FIG. 8, a perpendicular line is drawn from the instruction point to each side of the circumscribed rectangles of the five document image constituent elements such as "メディア", "メ" etc., and its length is obtained as the distance between the instruction point and each of the circumscribed rectangles. Then, the document image constituent element corresponding to the circumscribed rectangle whose distance to the instruction point is the shortest is detected as the instruction target. With this method, any of the document image constituent elements could possibly become the instruction target without being restricted by an inclusive relationship.

With the above described instruction method, one document image constituent element can be selected from a plurality of document image constituent elements whose regions have an inclusive relationship, but no other document image constituent element can be directly selected. Accordingly, the process for indirectly selecting another document image constituent element based on a previously selected document image constituent element must be provided.

Therefore, the selection operation for instructing the innermost element among other document image constituent elements including a previously instructed document image constituent element is assumed to be provided. If a user performs this selection operation in the state where "メ" is previously instructed in the example shown in FIG. 8, "メディア" outside "メ" will be instructed.

Additionally, the selection operation for instructing the largest document image constituent element including a previously instructed coordinate among the other document image constituent elements in a previously instructed document image constituent element may be provided. Assume that the document image constituent element "メディア" is instructed with the instruction of an intra-region coordinate of "メ". If a user performs this selection operation in this state, the largest document image constituent element "メ" including the intra-region instruction coordinate of "メ" is instructed.

As the method for displaying the type codes and the individual codes of a region of a document image constituent element as recognition result candidates, a separate display method for individually displaying the type codes and the individual codes as shown in FIG. 9 can be considered. Since the first recognition result candidate is the "character" in FIG. 9, character recognition is performed and the individual codes of the character recognition result are displayed. With this display method, however, it may be difficult to intuitively learn the correlationship between the type codes and the individual codes in many cases.

Therefore, if the first recognition result candidate is "character" as a result of the type recognition of a document image constituent element, which is performed by the individual region recognizing unit 23, character recognition is performed. The resulting candidate character codes are displayed as upper recognition result candidate codes as shown in FIG. 10. The type codes of the document image constituent element other than the "character", such as the "table", "graphic", "frame,", etc. , are displayed as lower recognition result candidate codes. As described above, the type codes and the individual codes are displayed as one list, so that the recognition result candidates can be viewed at a glance.

With such a one-string display method, if the first recognition result candidate is the type such as the "table", "graphic", "frame", etc. other than the "character", the candidate character codes obtained with the character recognition are displayed as lower recognition result candidate codes as shown in FIG. 11. Because the probability that the recognition result is the "character" is low in this case, the process for obtaining a character recognition result with a low probability of a correct answer will be performed.

Accordingly, if the first recognition result candidate is the type other than the "character", the type of the document image constituent element may regarded as the first recognition result candidate code, and only the type codes of the document image constituent element other than that of the first candidate may be regarded as lower recognition result candidate codes. With this method, only the types of the document image constituent element are displayed as candidates, and candidate characters of the character recognition are not displayed as shown in FIG. 12.

Adopting such a display method is intended for making a display easier to be viewed without displaying detailed information of the second and subsequent candidates. Because the probability that the first recognition candidate is a correct answer is normally high, the detailed information of the second and subsequent candidates consequently become unnecessary in many cases. Furthermore, with this method, the recognition process for the second and subsequent recognition result candidates such as the "character", etc. will be no longer needed, thereby speeding up the process.

Figure 13:
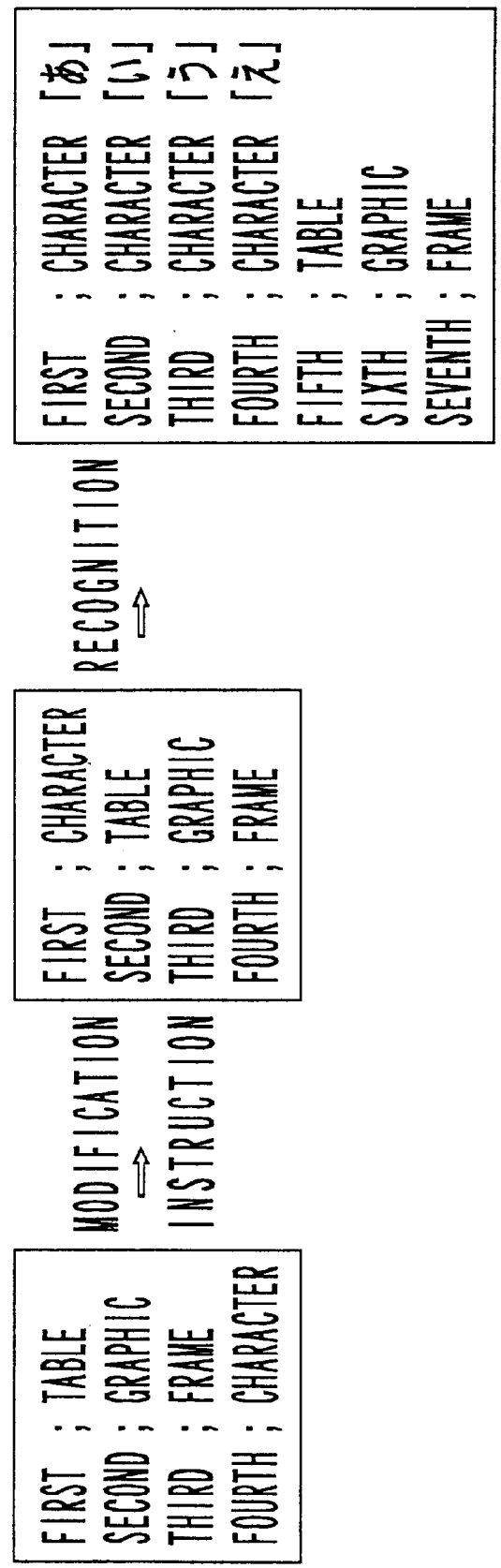
FIG. 13 shows a first modification-instruction.

A user can view thus displayed recognition result candidates, and can modify them. Assuming that the first type code "table" is instructed to be modified to the "character" as shown in FIG. 13, the ranks of the type codes other than the "character" move down by 1. Then, the character recognition is performed for a corresponding input character image depending on need, so that one or a plurality of the resultant candidate character codes replace the recognition result candidate code "character".

Additionally, if the type codes such as the "table", "graphic", "frame", etc. other than the "character" are modification-instructed as recognition result candidate codes, the recognition process is performed for a corresponding input character image as an instructed document image constituent element depending on need.

Figure 14:
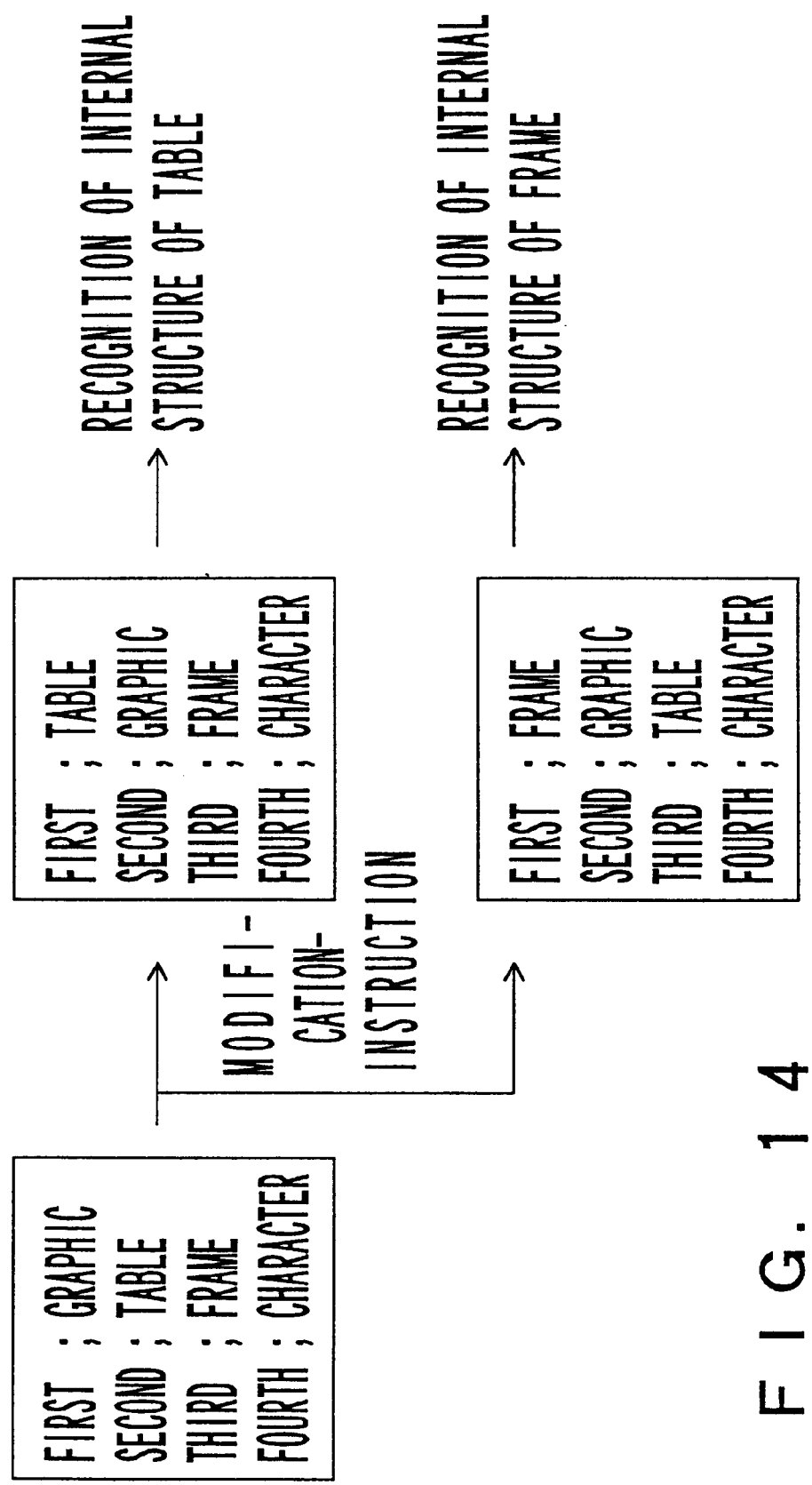
FIG. 14 shows a second modification-instruction.

By way of example, if the first type code "graphic" is instructed to be modified to the "table" or the "frame" as shown in FIG. 14, which has internal structures, the recognition process is performed for the internal structures of the instructed type code "table" or "frame". With the recognition process for the internal structure of the "table", ruled lines are extracted and vectorized; cells enclosed by the ruled lines are extracted; characters in the cells are recognized, etc. With the recognition process for the internal structure of the "frame", a frame is extracted and vectorized; a region within the frame is identified, etc.

Figure 16:
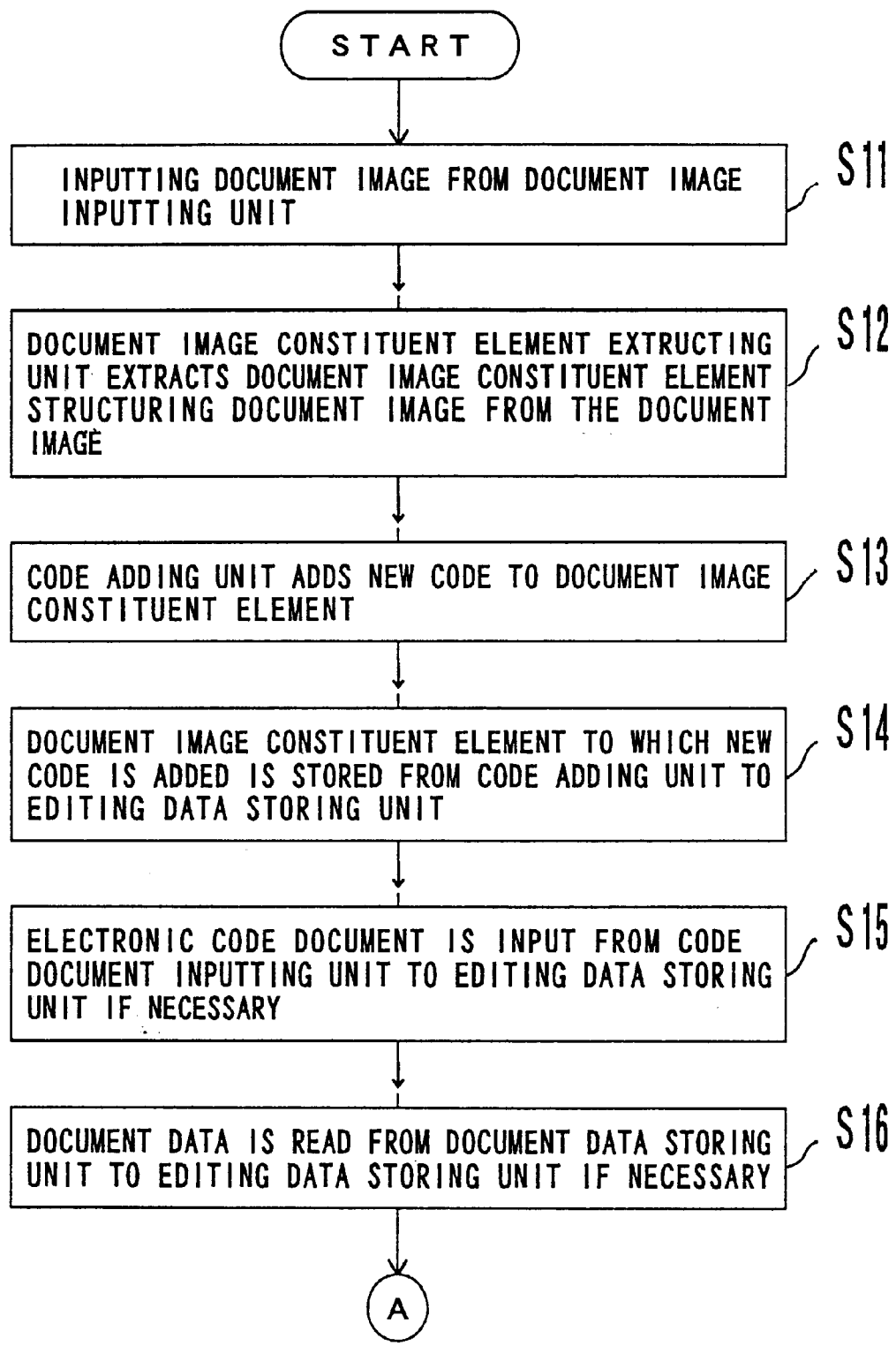
FIG. 16 is a flowchart showing a second document image process (No.1)

FIG. 15 is a block diagram showing the second configuration of the document image processing device according to the present invention. The document image processing device shown in this figure comprises a document image inputting unit 41, a document image constituent element extracting unit 42, a code adding unit 43, an editing data storing unit 44, a document data storing unit 45, a displaying unit 46, a code document inputting unit 47, an editing operation inputting unit 48, and an editing unit 49. This device performs the processes shown in FIGS. 16 and 17.

First of all, the document image inputting unit 41 inputs a digital image obtained by putting a document into an electronic form (step S11). The document image inputting unit 41 is, for example, a digital scanner. Next, the document image constituent element extracting unit 42 extracts a document image constituent element structuring a document image (step S12).

The code adding unit 43 adds a new code to the extracted document image constituent element (step S13), and stores the document image constituent element with the new code added in the editing data storing unit 44 (step S14). If necessary, the code document inputting unit 47 inputs an existing electronic document (electronic code document) to the editing data storing unit 44 (step S15). The existing electronic document data is a set of existing codes, and corresponds to existing character patterns. Accordingly, the editing data stored in the editing data storing unit 44 includes two types of data shown in FIG. 18.

In the editing data storing unit 44, a document image constituent element is represented as image data such as a bitmap, etc., and an external character code is used as a new code. Since the new code is automatically added to the bitmap data of the document image constituent element, a user need not design the shape of a character, etc. unlike a normal external character registration. Additionally, existing character patterns are represented by font data, etc.

If necessary, the document which was previously edited and is stored in the document data storing unit 45 may be read into the editing data storing unit 44 and used for editing (step S16).

Next, the displaying unit 46 displays the document to be edited on a screen by using the data in the editing data storing unit 44 (step S17). Image data is used for displaying a document image constituent element, while font data is used for displaying an existing character pattern.

When a document editing operation performed by a user is input from the editing operation inputting unit 48 to the editing unit 49 (step S18), the editing unit 49 edits the data in the editing data storing unit 44 (step S19). At this time, a set of new codes and existing codes will become a direct target of the editing process. For the display process, image data and font data are used.

When a document image constituent element is copied or moved, a user issues an instruction on a displayed image by using a pointing device, etc. Upon receiving the instruction, the editing unit 49 performs the instructed editing process, for the new code corresponding to the instructed document image constituent element. Because the new code corresponding to the document image constituent element is automatically processed by a system as described above, a user need not directly handle the new code.

The document data for which the editing operation is completed is stored in the document data storing unit 45 from the editing data storing unit 44 (step S20), and the process is terminated. The document data stored in the document data storing unit 45 may be read into the editing data storing unit 44, and reedited there.

Figure 19:
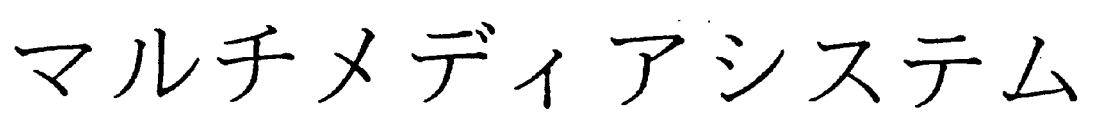
Figure 20:
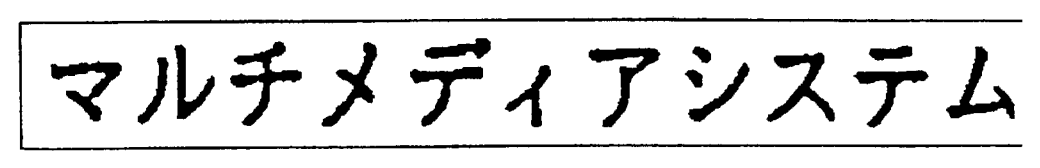

Assume that the code document shown in FIG. 19 is printed on a paper medium, copied and faxed several times, and then input from the document image inputting unit 41 as an image. Because its printing quality is degraded during this process, the input image will become the document image shown in FIG. 20.

Figure 21:
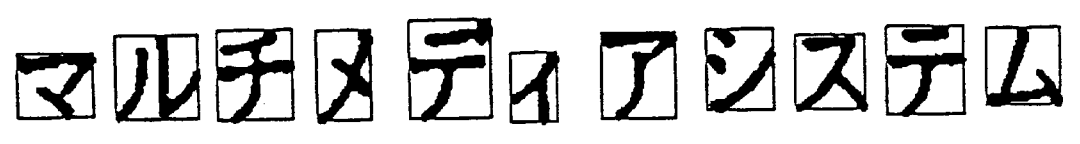

The document image constituent element extracting unit 42 extracts the document image constituent elements shown in FIG. 21. Here, each of the extracted document image constituent elements is displayed on a screen by using a circumscribed rectangle. To each of the document image constituent elements, a new code is added by the code adding unit 43. As a result, it becomes possible to edit each of them.

A user can generate an image shown in FIG. 22 by changing the order of the document image constituent elements included in the displayed image. Here, the image "マルチメディアシステム" is edited and changed to "メディアマルチシステム".

Figure 23:
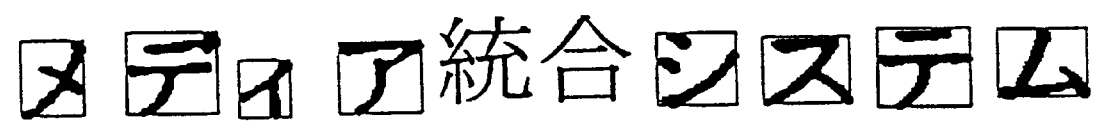

Also the code document input from the code document inputting unit 47 and the document image constituent elements can be mixed and edited. Assuming that the editing operation for replacing the document image constituent elements "マルチ" with the code document "統合", the document shown in FIG. 23 will be generated. After all of the editing operations are completed, the display of the document image constituent elements with the circumscribed rectangles is canceled. The document after being edited is printed, recognized, etc. according to a user instruction.

As described above, it becomes possible to edit the document where an existing code and a new code are mixed by corresponding the new code to a document image constituent element image, and displaying the display information of the new code on the displaying unit 46.

The displaying unit 46 uses a reduced or enlarged image including an equimultiple image of a document image constituent element image as the display information of the new code corresponding to the document image constituent element image. Because the size of the document image constituent element image varies, it is convenient to change the size and display the image so as to edit the image together with existing document data.

Figure 24:
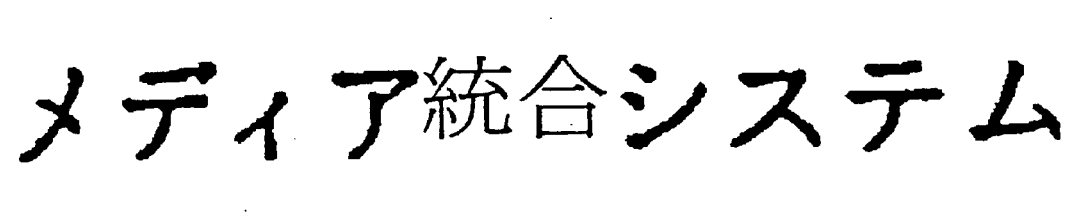

For the most typical document image as a document image constituent element image, its size is made identical to the size of an existing character pattern and the image is displayed. Therefore, the character image is displayed by being reduced or enlarged. In FIG. 24, the sizes of the character images "メディア" and "システム" and the size of the existing character pattern "統合" are made identical and are displayed.

Figure 25:
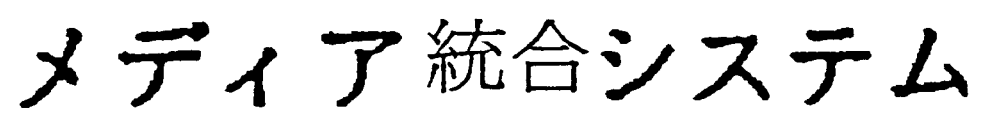
Figure 26:
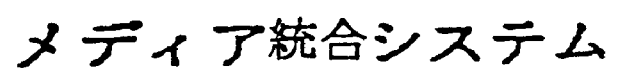

If the character images are reduced and displayed while maintaining the consistency with the size of the existing character pattern, they will become the images shown in FIG. 25. If they are further reduced, they will become the images shown in FIG. 26.

However, if the document image constituent element image is enlarged/reduced as it remains to be the image data, its shape may be sometimes changed and displayed. Therefore, if outline data (outline font) obtained by vectorizing the outline of a document image constituent element image is used for displaying the document image constituent element, the shape can be prevented from being changed even if the image is reduced/enlarged.

Figure 27:
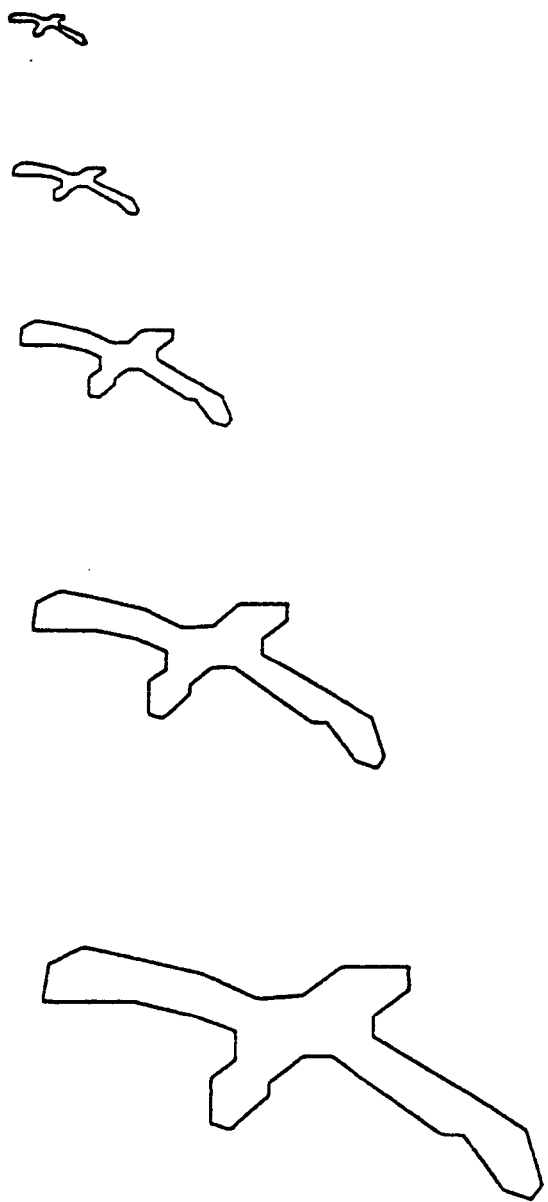
FIG. 27 shows an outline display.

For example, if the outline data obtained by vectorizing the character image "メ" is enlarged/reduced, the display shown in FIG. 27 can be obtained. In this figure, all of the character shapes are proved to be similar.

When an edited document image is recognized, the document data is input to the document processing device shown in FIG. 3A. After the above described region identification process and recognition process are performed, recognition result candidates are displayed and modified.

With the conventional recognition result display method, the character patterns of the recognition result candidate codes and the corresponding character image are separately displayed as shown in FIG. 1B. Accordingly, the amount of a viewpoint move for verification is significant, so that a considerable load is imposed on a user.

Figure 28:
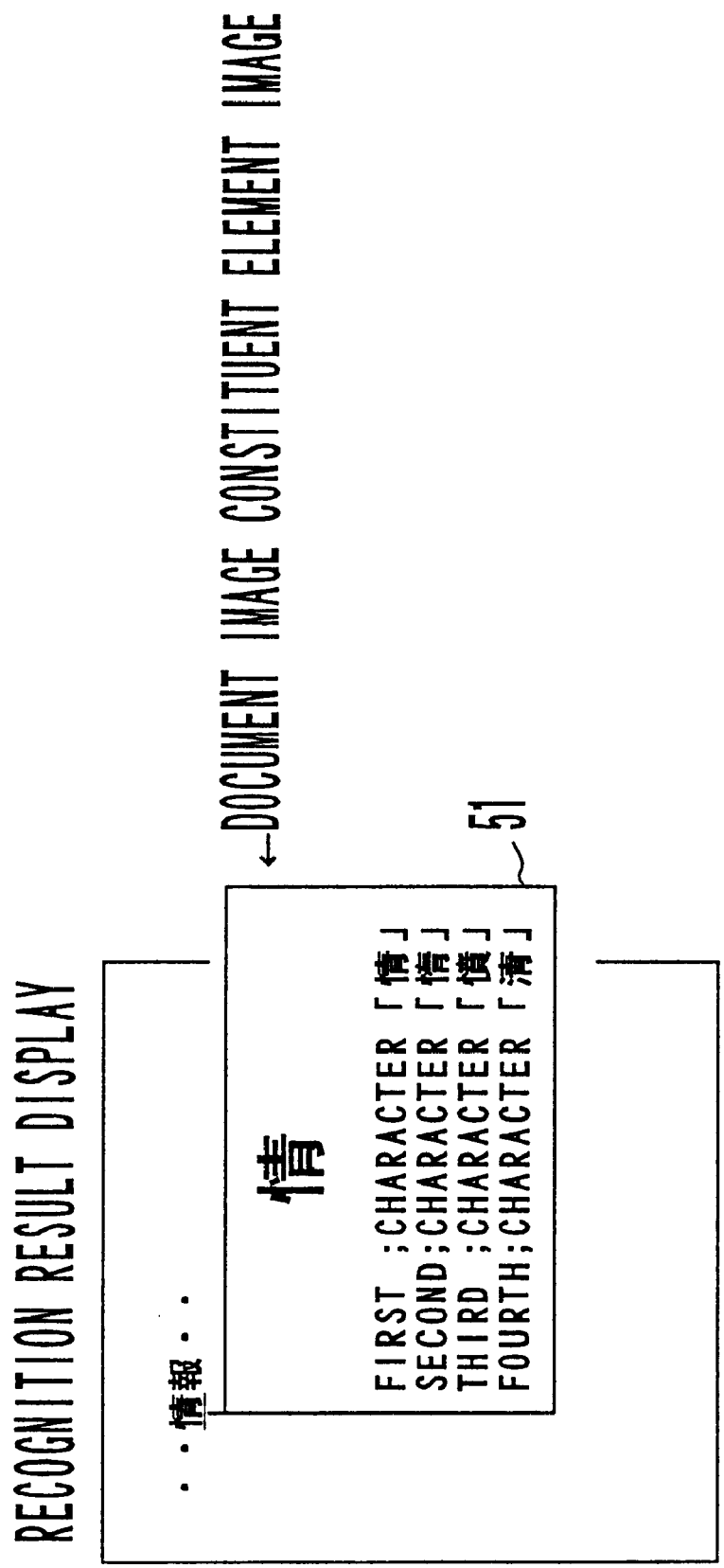
FIG. 28 shows a fifth display of a recognition result.

Therefore, according to this preferred embodiment, the corresponding document image constituent element image is displayed, as shown in FIG. 28, together with the character patterns of the recognition result candidates in a display region 51 (on a display window) of the recognition result candidates. As described above, the document image constituent element is separated from the input document image and is displayed close to the recognition result candidates, so that the amount of a viewpoint move can be significantly reduced and a user can easily verify the suitability of the recognition result.

Figure 29:
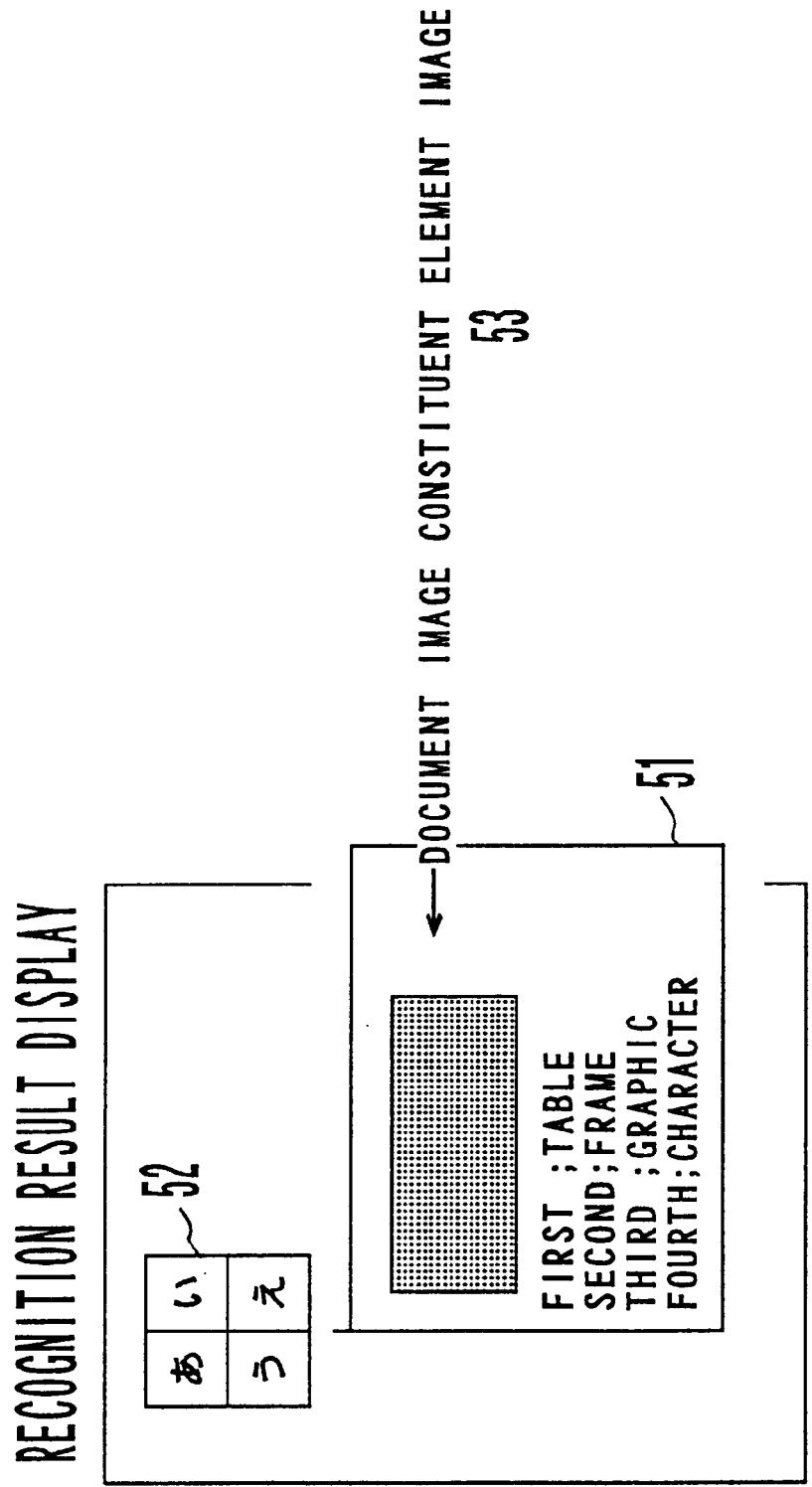
FIG. 29 shows a sixth display of the recognition result.

If the document image constituent element is other than the character, the original image can be displayed in a display region of recognition result candidates in a similar manner. By way of example, for the recognition result 52 shown in FIG. 29, the document image constituent element image 53 is displayed in the display region 51 together with a "table", "frame", etc., which represent the type codes of recognition result candidates. With this display, a user can easily verify the suitability of the recognition result 52.

Additionally, thus displayed document image constituent element image may be used for modification. The recognition result display of normal character recognition may not include a correct answer among candidates. If a user selects a document image constituent element image in such a case, a candidate character code included in a recognition result is replaced with the code of the document image constituent element, and a suitable document which partially uses image data is displayed on a screen.

Figure 30:
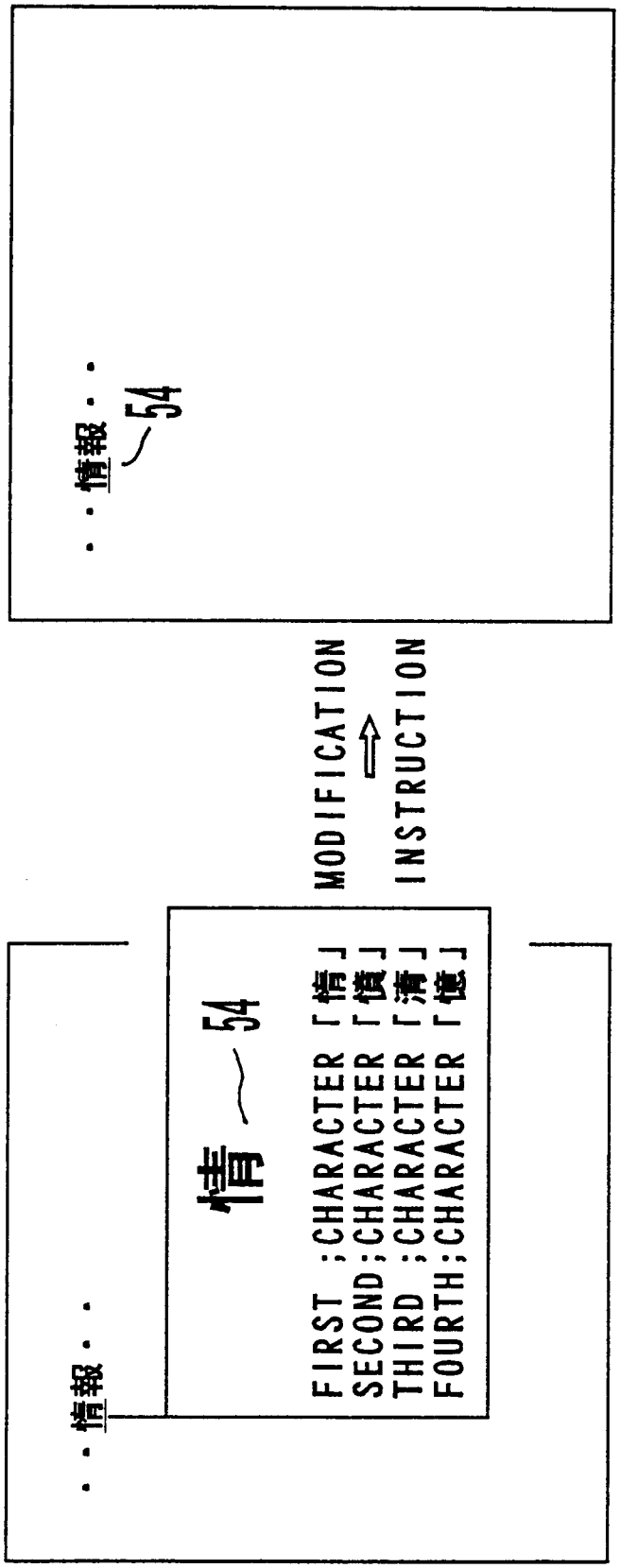
FIG. 30 shows a third modification-instruction.

Assuming that the correct answer "情" does not exist among displayed candidate characters in the recognition result shown in the left side of FIG. 30, a user selects, and modification-instructs the document image constituent element image 54. As a result, the recognition result is modified and displayed by using an image 54 as shown in the right side of this figure.

Figure 31:
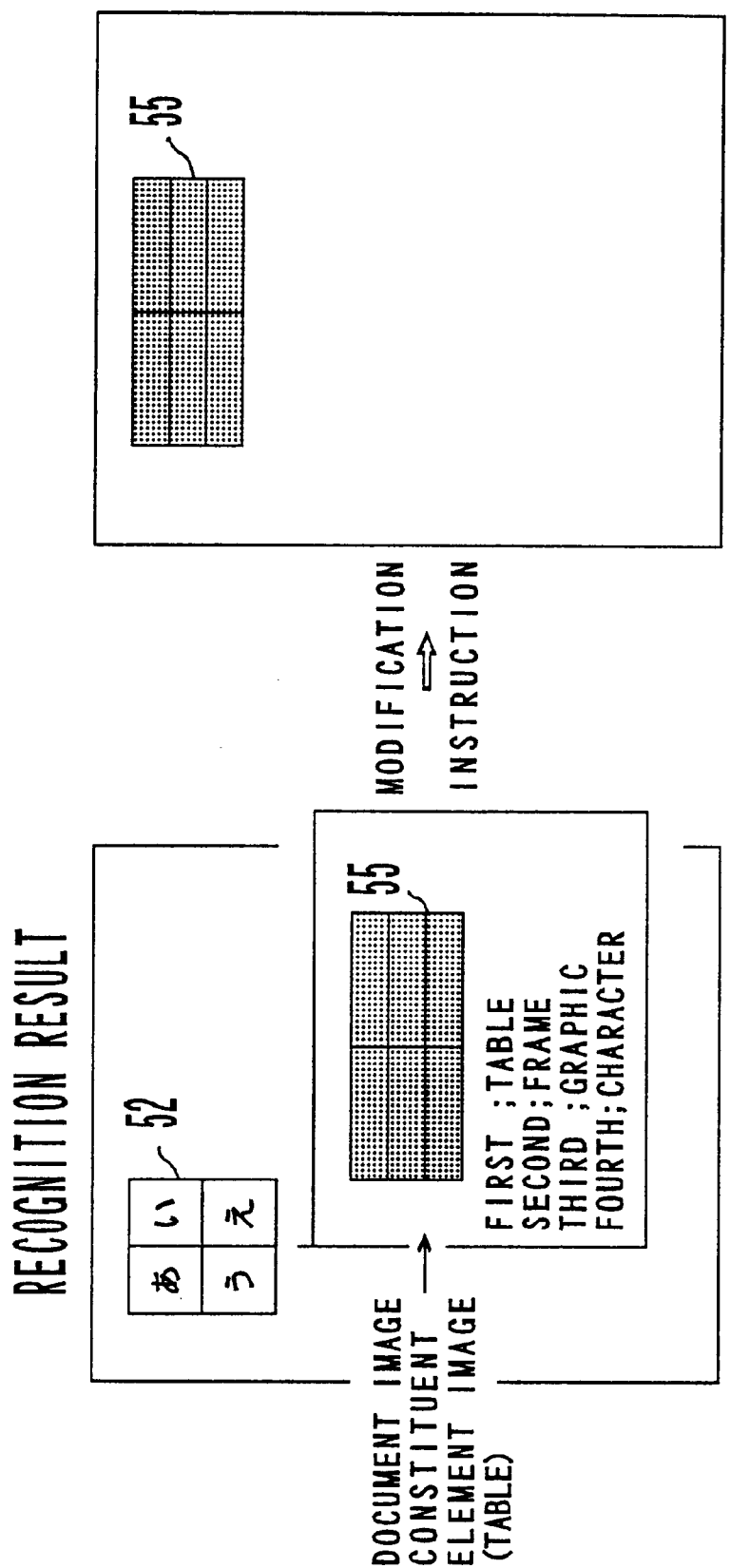
FIG. 31 shows a fourth modification-instruction.

If the displayed recognition result 52 is not correct in the recognition result of the table shown in the left side of FIG. 31, a user selects the document image constituent element image 55, and issues a modification-instruction. As a result, the recognition result is modified and displayed by using the image 55 as shown in the right side.

As described above, if a document image constituent element image in a recognition result candidate display can be modification-instructed and a user selects this image, the editing process is performed by using the code corresponding to the document image constituent element image. Accordingly, a suitable recognition result candidate is included at least in a display.

Furthermore, a document image constituent element can be handled according to a type attribute by giving the type attribute such as a "character", a "table", a "graphic", a "frame", etc. to the document image constituent element.

The type attribute is stored in the recognition result storing unit 24 shown in FIG. 3A together with the code of the document image constituent element image. Because the degree of certainty of the first recognition candidate is normally the highest in a recognition result, the attribute corresponding to the type of the code is automatically added to the document image constituent element image as a type attribute.

Figure 32:
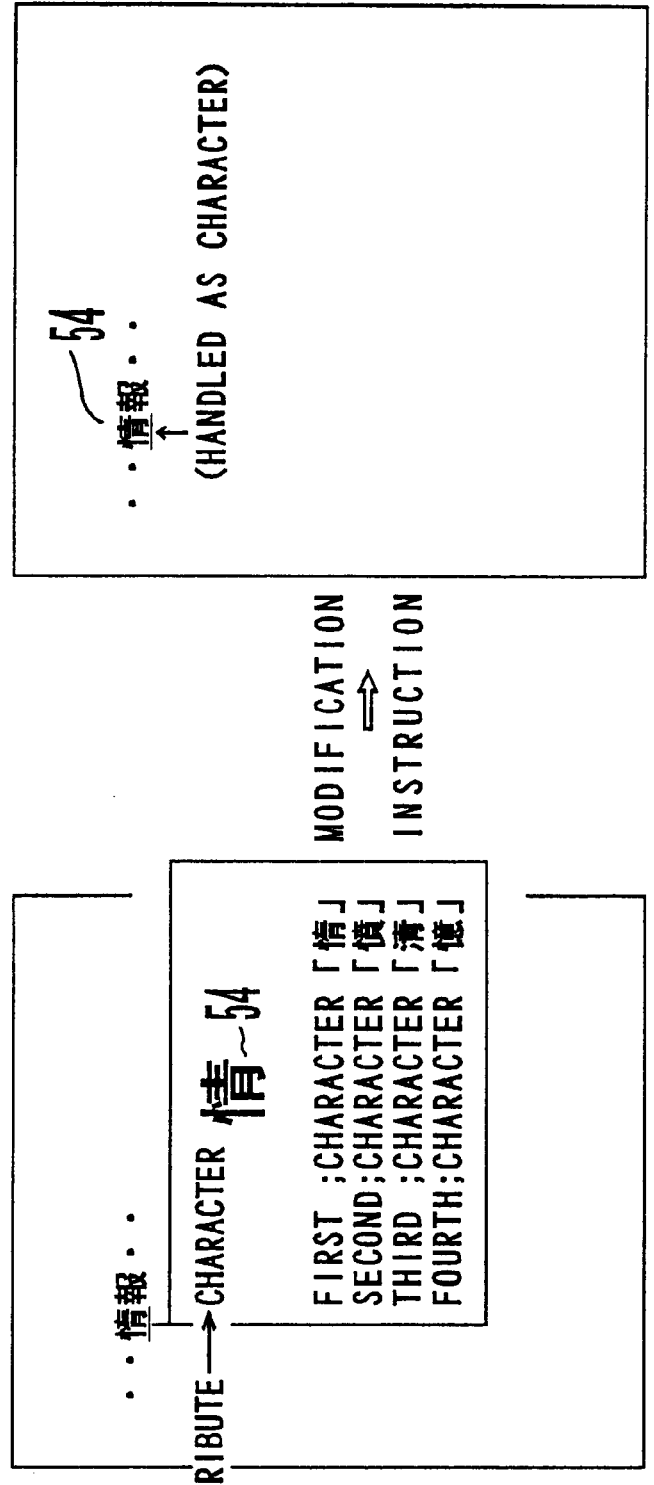
FIG. 32 shows a fifth modification-instruction.
Figure 33:
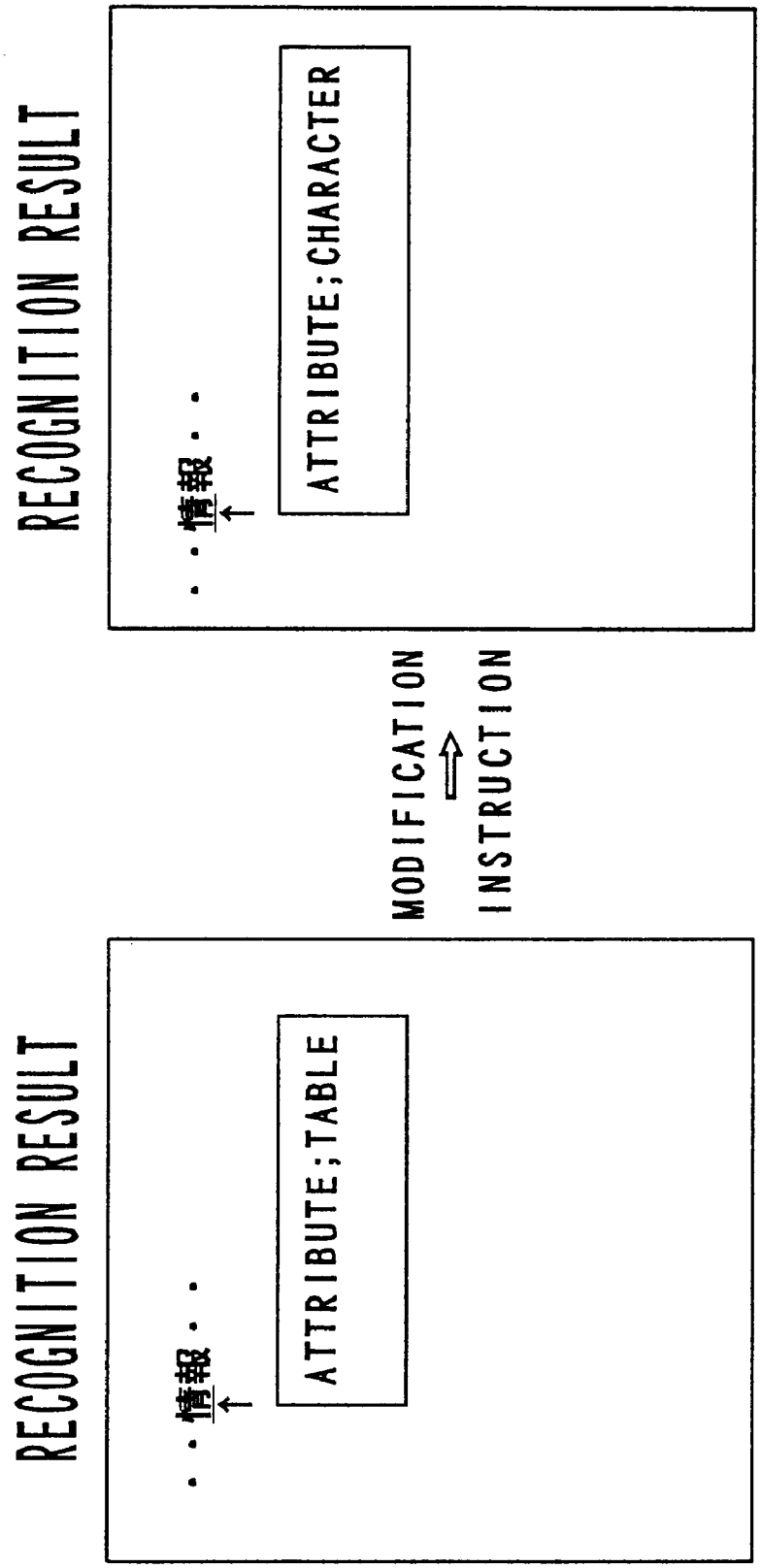
FIG. 33 shows a sixth modification-instruction.

By way of example, the type attribute of the first candidate "情" is the "character" in the recognition result shown in the left side of FIG. 32. Therefore, also the attribute of the document image constituent element image 54 is the "character".

A user may select the document image constituent element image in such a recognition result display, and may perform the process for recognizing the image again according to its type attribute. In the example shown in FIG. 32, if the user selects, and modification-instructs the document image constituent element image 54, the corresponding character pattern is replaced with the document image constituent element image 54 as shown in the right side and the character recognition is again performed.

Meanwhile, if the type attribute corresponding to the first recognition candidate is provided to the document image constituent element image, there is the possibility that it is incorrect. Therefore, an external interface unit for modification-instructing the type attribute of the document image constituent element image is arranged in the modifying unit 26 shown in FIG. 3A. This external interface unit changes the type attribute of the document image constituent element image according to a user instruction. For example, the attribute of "情" which is a document image constituent element is changed from the "table" to the "character".

As is often the case, the distance value between each candidate code of a recognition result and a recognition dictionary is calculated, and the degree of certainty may be provided to each candidate code with the recognition process. Therefore, according to this preferred embodiment, a predetermined degree of certainty is provided also to a document image constituent element, and candidate codes and the document image constituent element image are sequentially ranked in descending order of the degree of certainty. Even if the degrees of certainty of the candidate codes which are the original recognition result candidates are low, the document image constituent element image will become the first recognition result candidate with such ranking. Therefore, a recognition result document is suitably displayed.

FIGS. 34 and 35 show the examples in which recognition candidate results are displayed together with the degrees of certainty. In FIG. 34, the degree of certainty of "情" which is a document image constituent element image is 60 and is displayed as the second candidate. In the meantime, the degree of certainty of "情", is 70 in FIG. 35 and is displayed as the first candidate.

As described above, ranks may vary depending on the difference between relative degrees of certainty between the document image constituent element image and another candidate code. Accordingly, the degree of certainty of the document image constituent element image can be used as a threshold for replacing the original recognition result candidate with the document image constituent element image. Therefore, an external interface unit for inputting the degree of certainty of a document image constituent element image is arranged in the modifying unit 26 shown in FIG. 3A, so that a user can adjust the threshold.

Each time the degree of certainty of the document image constituent element image is input, the modifying unit 26 compares it with the degree of certainty of another candidate, and updates the display of the first recognition result candidate if necessary. In this way, a user can interactively adjust the threshold of the degree of certainty while verifying the result.

At this time, the displaying unit 25 shown in FIG. 3A may display a predetermined number of recognition result candidates as shown in FIGS. 34 and 35. Or, it may set up a window for displaying only the first candidate. Because the amount of a viewpoint move of the user is reduced by displaying only the first candidate, the adjustment operation of the threshold is made efficient.

The document image processing device according to this embodiment can be configured by using the information processing device (computer) shown in FIG. 36. The information processing device shown in FIG. 36 comprises a CPU (Central Processing Unit) 61, a memory 62, an input device 63, an output device 64, an external storage device 65, a medium driving device 66, a network connecting device 67, and a photoelectric converting device 68. These components are interconnected via a bus 69.

The memory 62 stores the program and data used for the above described document image process. As the memory 62, for example, a ROM (Read Only Memory), a RAM (Random Access Memory), etc. are used. The CPU 61 performs necessary processes by executing the program using the memory 62.

The input device 63 is, for example, a keyboard, a pointing device, a touch panel, etc., and is used for inputting an instruction or necessary information from a user. The output device 64 is, for example, a display, a printer, etc., and is used for outputting a process result, etc.

The external storage device 65 is, for example, a magnetic disk device, an optical disk device, a magneto-optical disk device, etc. The above described program and data may be stored in the external storage device 65, and may be used by being loaded into the memory 62 depending on need.

The medium driving device 66 drives a portable storage medium 70, and accesses its stored contents. As the portable storage medium 70, an arbitrary computer-readable storage medium such as a memory card, a floppy disk, a CD-ROM (Compact Disk-Read Only Memory), an optical disk, a magneto-optical disk, etc. may be used. The above described program and data may be stored in the portable storage medium 70, and may be used by being loaded into the memory 62 depending on need.

The network connecting device 67 communicates with an external device via an arbitrary network (line) such as a LAN (Local Area Network), and performs data conversion accompanying communications. In this way, the document image processing device can receive the above described program and data from the external device, and can use the program and data by loading them into the memory 62.

The photoelectric converting device 68 is, for example, a digital scanner, and inputs an image of a document represented on a paper medium.

Figure 37:
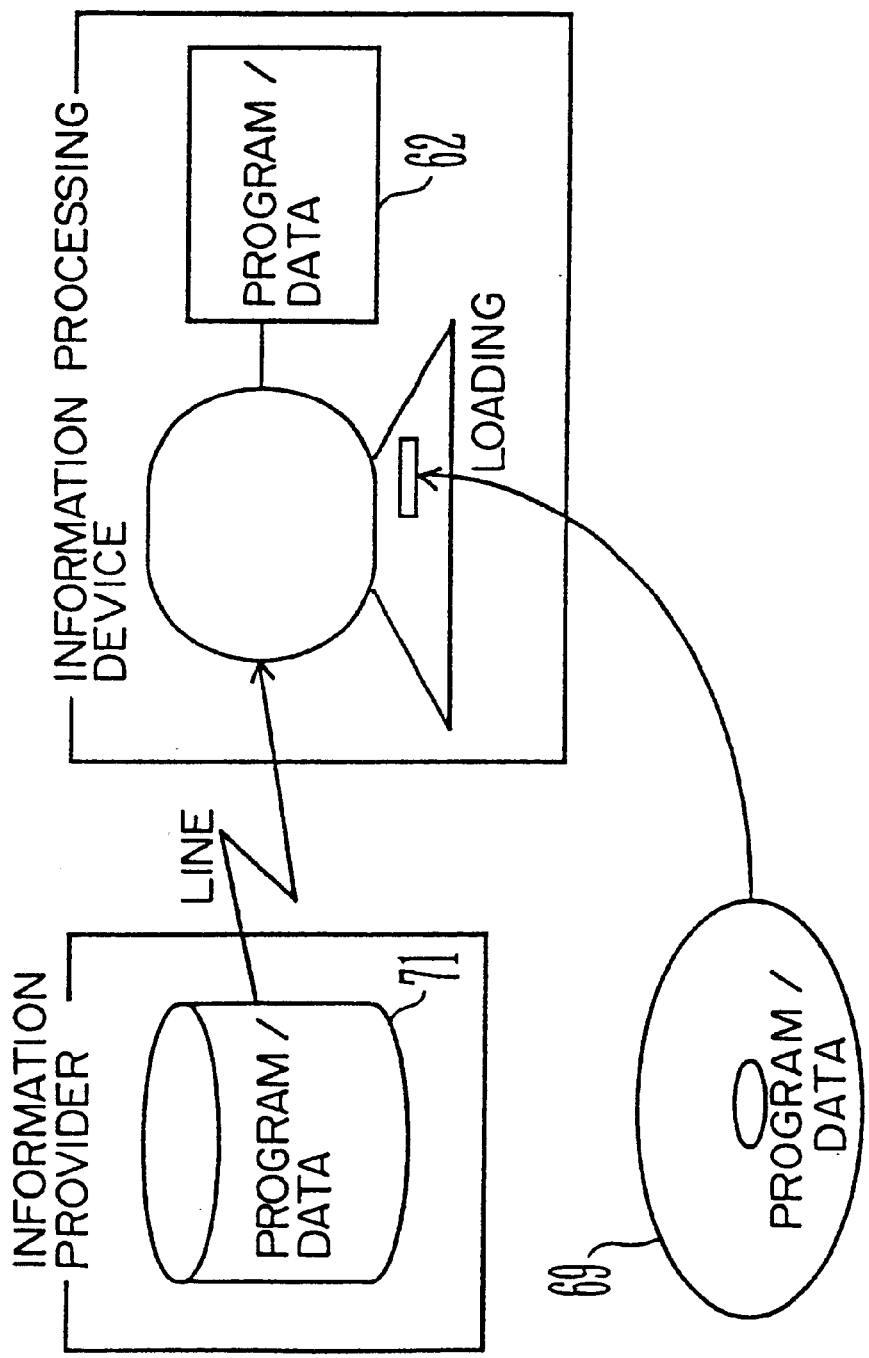
FIG. 37 is a schematic diagram showing storage media.

FIG. 37 is a schematic diagram showing computer-readable storage media which can provide a program and data to the information processing device shown in FIG. 36. The program and data stored in the portable storage medium 70 or an external database 71 are loaded into the memory 62. Then, the CPU 61 executes the program by using the data, and performs necessary processes.

According to the present invention, both region identification and intra-region recognition of a document image can be simultaneously performed, and their results can be simultaneously modified. Therefore, a user load on modification operations can be reduced. Conventionally, a user is constrained during the modification operations performed at two stages. According to the present invention, however, the constraint time is eliminated.

Additionally, because an original image is displayed as one of recognition result candidates of intra-region recognition, the amount of a viewpoint move for making a comparison and verification between a recognition result and an input image is reduced, thereby reducing a user load. If no correct answer exists among recognition result candidates, the original image can be selected to modify the result, which eliminates the need for re-inputting a character code for modification.

What is claimed is:

1. An image processing device for performing a recognition process of an input image, comprising:

an identifying device identifying a pattern region of the input image, the pattern region including a pattern in the input image, and determining a type of the pattern region according to whether the pattern region has an internal structure of pattern regions;

a recognizing device performing an image recognition process of the pattern included in the pattern region;

an outputting device displaying type code information indicating the determined type of the pattern region as a recognition result candidate of an image constituent element structuring the input image when the pattern region has the internal structure, and outputting the type code information and individual code information indicating the pattern as the recognition result candidate when the pattern region does not have the internal structure; and a modifying device modifying the recognition result candidate, wherein if said identifying device determines a first candidate of the type of the pattern region to be a character, said recognizing device performs a character recognition process of the pattern included in the pattern region and said outputting device displays a list of recognition result candidates, which includes individual code information of one or more candidate characters of a recognition result as upper recognition result candidates and type code information other than the character as a lower recognition result candidate; and a user modifies the displayed list of the recognition result candidates using said modifying device.

2. The image processing device according to claim 1, wherein:

the input image includes as the pattern region a region corresponding to one of a text, a table, a graphic, a frame, and a character, and the type code information indicates a type corresponding to one of the text, the table, the graphic, the frame, and the character.

3. The image processing device according to claim 2, wherein:

if the type code information indicates the character, the individual code information indicates a corresponding character pattern.

4. The image processing device according to claim 1, wherein:

said modifying device designates an image constituent element to be modified by using a corresponding pixel region.

5. The image processing device according to claim 1, wherein:
said modifying device designates an image constituent element to be modified by using a circumscribed rectangle of a corresponding pixel region.

6. The image processing device according to claim 1, wherein:
said outputting device includes a displaying device displaying the image constituent element on a screen; and
said modifying device regards an innermost image constituent element including a position instructed on the screen as an instructed image constituent element.

7. The image processing device according to claim 1, wherein:
said outputting device includes a displaying device displaying the image constituent element on a screen; and
said modifying device regards a largest image constituent element including a position instructed on the screen as an instructed image constituent element.

8. The image processing device according to claim 1, wherein:
said outputting device includes a displaying device displaying the image constituent element on a screen; and
said modifying device regards an image constituent element having a circumscribed frame closest to a position instructed on the screen as an instructed image constituent element.

9. The image processing device according to claim 1, wherein:
said outputting device includes a displaying device displaying the image constituent element on a screen; and
said modifying device includes an instructing device instructing an image constituent element on the screen, and regards an innermost image constituent element including a previously instructed image constituent element as a newly instructed image constituent element.

10. The image processing device according to claim 1, wherein:
said outputting device includes a displaying device displaying the image constituent element on a screen; and
said modifying device includes an instructing device instructing an image constituent element on the screen, and regards a largest image constituent element which includes an instructed coordinate among image constituent elements in a previously instructed image constituent element as a newly instructed image constituent element.

11. The image processing device according to claim 1, wherein:
if said identifying device determines a first candidate of the type of the pattern region to be a character, said recognizing device performs a character recognition process of the pattern included in the pattern region, and said outputting device outputs individual code information of one or more candidate characters of a recognition result as upper recognition result candidates and outputs type code information other than the character as a lower recognition result candidate.

12. The image processing device according to claim 1, wherein:
if said identifying device determines a first candidate of the type of the pattern region to be a particular type other than a character, said outputting device outputs type code information of the particular type as an upper recognition result candidate, and outputs other type code information as a lower recognition result candidate.

13. The image processing device according to claim 1, wherein:
if said modifying device modifies type code information of an output recognition result candidate to a character, said recognizing device performs a character recognition process of the pattern included in the pattern region depending on need, and said outputting device outputs individual code information of one or more candidate characters of a recognition result as upper recognition result candidates.

14. The image processing device according to claim 1, wherein:
said modifying device modifies type code information of an output recognition result candidate to a particular type other than a character, said recognizing device performs a recognition process of the pattern included in the pattern region according to the particular type.

15. An image processing device, comprising:
an extracting device extracting a partial image structuring an input image from the input image;
a code adding device adding new code information to image data corresponding to the partial image, the new code information representing the image data;
an outputting device outputting document information where the image data corresponding to the partial image and a character pattern corresponding to existing code information are mixed; and
an editing device editing the document information with the image data and the character pattern mixed by using the new code information as an operation target for the image data and the existing code information as an operation target for the character pattern.

16. The image processing device according to claim 15, wherein:
said outputting device outputs image data obtained by changing a size of the partial image.

17. The image processing device according to claim 15, wherein:
said outputting device outputs image data obtained by vectorizing an outline of the partial image.

18. An image processing device, comprising:
an extracting device extracting a partial image structuring an input image from the input image;
a recognizing device performing an image recognition process of the partial image;
an outputting device separating image data corresponding to the partial image from the input image, and displaying the partial image data together with a plurality of candidates of a recognition result of the partial image within a candidate display region, the candidates corresponding to different image recognition results for a same image element; a selecting device selecting any of the one or more candidates and the image data; and an editing device adding new code information to a partial image corresponding to the image data when the image data is selected, and editing a document where the image data and a character pattern corresponding to existing code information are mixed.

19. The image processing device according to claim 18, wherein:
said recognizing device adds type code information to the partial image.

20. The image processing device according to claim 19, wherein:
    said recognizing device adds type code information corresponding to a first candidate of the recognition result to the partial image.

21. The image processing device according to claim 19, further comprising:
    a modifying device modifying the type code information of the partial image.

22. The image processing device according to claim 18, wherein:
    said recognizing device obtains a degree of certainty of the one or more candidates; and
    said outputting device provides a predetermined degree of certainty to the image data corresponding to the image constituent element, and ranking the one or more candidates and the image data in descending order of the degree of certainty.

23. The image processing device according to claim 22, further comprising:
    an inputting device inputting the degree of certainty of the image data corresponding to the image constituent element.

24. The image processing device according to claim 23, wherein:
    said outputting device outputs information of the first rank among the one or more candidates and the image data, and changing the information of the first rank according to the degree of certainty input from said inputting device.

25. A computer-readable storage medium storing a program, which is intended for a computer performing a recognition process of an input image, for directing the computer to execute:
    displaying type code information indicating a type of a pattern region of the input image as a recognition result candidate of a partial image structuring the input image when the pattern region has an internal structure;
    displaying the type code information and individual code information indicating a pattern included in the pattern region as the recognition result candidate when the pattern region does not have the internal structure;
    performing a character recognition process of the pattern included in the pattern region and displaying a list of recognition result candidates if a first candidate of the type of the pattern region is a character, the list including individual code information of one or more candidate characters of a recognition result as upper recognition result candidates and type code information other than the character as a lower recognition result candidate; and
    modifying the displayed list of the recognition result candidates according to a user instruction.

26. A computer-readable storage medium storing a program, which is intended for a computer, for directing the computer to execute:
    extracting a partial image structuring an input image from the input image;
    adding new code information to image data corresponding to the partial image , the new code information representing the image data;
    outputting document information where the image data corresponding to the partial image and a character pattern corresponding to existing code information are mixed;
    and editing the document information with the image data and the character pattern mixed by using the new code information as an operating target for the image data and the existing code information as an operation target for the character pattern.

27. A computer-readable storage medium storing a program, which is intended for a computer, for directing the computer to execute:
    extracting a partial image structuring an input image from the input image;
    performing an image recognition process of the partial image;
    separating image data corresponding to the partial image from the input image, and displaying the partial image data together with a plurality of candidates of a recognition result of the partial image within a candidate display region, the candidates corresponding to different image recognition results for the same partial image; a selecting process selecting any of the one or more candidates and the image data; and an editing process adding new code information to a partial image corresponding to the image data when the image data is selected, and editing a document where the image data and a character pattern corresponding to existing code information are mixed.

28. An image processing method, comprising:
    inputting an image to a computer;
    identifying a pattern region of an input image, the pattern region including a pattern in the input image, and determining a type of the pattern region according to whether the pattern region has an internal structure of pattern regions;
    displaying type code information indicating the determined type of the pattern region on a screen as a recognition result candidate of a partial image structuring the input image when the pattern region has the internal structure;
    displaying the type code information and individual code information indicating the pattern as the recognition result candidate when the pattern region does not have the internal structure;
    performing a character recognition process of the pattern included in the pattern region and displaying a list of recognition result candidates if a first candidate of the type of the pattern region is a character, the list including individual code information of one or more candidate characters of a recognition result as upper recognition result candidates and type code information other than the character as a lower recognition result candidate; and
    modifying the displayed list of the recognition result candidates according to a user instruction.

29. An image processing method, comprising:
    inputting an image to a computer;
    extracting a partial image structuring an input image from the input image;
    adding new code information to image data corresponding to the partial image, the new code information representing the image data;
    displaying document information where the image data corresponding to the partial image and a character pattern corresponding to existing code information are mixed on a screen; and
    editing the document information with the image data and the character pattern mixed by using the new code information as an operation target for the image data and the existing code information as an operation target for the character pattern.

30. An image processing method, comprising:

inputting an image to a computer;

extracting a partial image structuring an input image from the input image;

performing an image recognition process of the partial image;

separating image data corresponding to the partial image from the input image, and displaying the partial image data together with a plurality of candidates of a recognition result of the image constituent element within a candidate display region on a screen, the candidates corresponding to different image recognition results for the same partial image; a selecting process selecting any of the one or more candidates and the image data; and an editing process adding new code information to a partial image corresponding to the image data when the image data is selected, and editing a document where the image data and a character pattern corresponding to existing code information are mixed.

* * * * *